United States Patent
Jin et al.

(10) Patent No.: US 11,021,934 B2
(45) Date of Patent: Jun. 1, 2021

(54) PRODUCTION LOGGING INVERSION BASED ON DAS/DTS

(71) Applicant: CONOCOPHILLIPS COMPANY, Houston, TX (US)

(72) Inventors: Ge Jin, Houston, TX (US); Kyle Friehauf, Houston, TX (US); Baishali Roy, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 62 days.

(21) Appl. No.: 16/401,620

(22) Filed: May 2, 2019

(65) Prior Publication Data

US 2019/0338621 A1 Nov. 7, 2019

Related U.S. Application Data

(60) Provisional application No. 62/665,536, filed on May 2, 2018.

(51) Int. Cl.
*E21B 41/00* (2006.01)
*E21B 47/07* (2012.01)
(Continued)

(52) U.S. Cl.
CPC .......... *E21B 41/0092* (2013.01); *E21B 43/16* (2013.01); *E21B 47/07* (2020.05);
(Continued)

(58) Field of Classification Search
CPC ...... E21B 41/0092; E21B 41/00; E21B 43/16; E21B 47/107; E21B 47/07; G06Q 10/06
See application file for complete search history.

(56) References Cited

U.S. PATENT DOCUMENTS 3,981,187 A 9/1976 Howell
4,676,664 A 6/1987 Anderson et al.
(Continued)

FOREIGN PATENT DOCUMENTS

GB 2492802 1/2013
WO 2001048353 7/2001
(Continued)

OTHER PUBLICATIONS

Awada, A., et al. "Is that interference? A work flow for identifying and analyzing communication through hydraulic fractures in a multiwell pad," SPE Journal, vol. 21, No. 5, pp. 13 (Oct. 2016).
(Continued)

*Primary Examiner* — Catherine Loikith
(74) *Attorney, Agent, or Firm* — Boulware & Valoir

(57) ABSTRACT

A method of optimizing production of a hydrocarbon-containing reservoir by measuring low-frequency Distributed Acoustic Sensing (LFDAS) data in the well during a time period of constant flow and during a time period of no flow and during a time period of perturbation of flow and simultaneously measuring Distributed Temperature Sensing (DTS) data from the well during a time period of constant flow and during a time period of no flow and during a time period of perturbation of flow. An initial model of reservoir flow is provided using the LFDAS and DTS data; the LFDAS and DTS data inverted using Markov chain Monte Carlo method to provide an optimized reservoir model, and that optimized profile utilized to manage hydrocarbon production from the well and other asset wells.

17 Claims, 13 Drawing Sheets

(51) Int. Cl.
    *E21B 47/107*     (2012.01)
    *G01F 1/66*     (2006.01)
    *G01K 1/02*     (2021.01)
    *E21B 43/16*     (2006.01)

(52) U.S. Cl.
    CPC ............ *E21B 47/107* (2020.05); *G01F 1/661* (2013.01); *G01K 1/026* (2013.01)

(56) References Cited

U.S. PATENT DOCUMENTS

| | | |
|---|---|---|
| 6,026,913 A | 2/2000 | Mandal et al. |
| 6,176,323 B1 | 1/2001 | Weirich et al. |
| 6,268,911 B1 | 7/2001 | Tubel et al. |
| 6,778,720 B1 | 8/2004 | Cekorich et al. |
| 7,055,604 B2 | 6/2006 | Jee et al. |
| 7,668,411 B2 | 2/2010 | Davies et al. |
| 8,505,625 B2 | 8/2013 | Ravi et al. |
| 8,630,816 B2 | 1/2014 | Park et al. |
| 8,646,968 B2 | 2/2014 | MacDougall et al. |
| 8,930,143 B2 | 1/2015 | Sierra et al. |
| 8,950,482 B2 | 2/2015 | Hill et al. |
| 9,116,119 B2 | 8/2015 | Le Floch |
| 9,273,548 B2 | 3/2016 | LeBlanc et al. |
| 9,347,310 B2 | 5/2016 | Unalmis et al. |
| 9,416,644 B2 | 8/2016 | McEwen-King et al. |
| 9,464,512 B2 | 10/2016 | Kalia et al. |
| 10,095,828 B2 | 10/2018 | Swan et al. |
| 2002/0180728 A1 | 12/2002 | Neff et al. |
| 2003/0205375 A1 | 11/2003 | Wright et al. |
| 2006/0272809 A1 | 12/2006 | Tubel et al. |
| 2008/0277568 A1 | 11/2008 | Crickmore et al. |
| 2009/0114386 A1 | 5/2009 | Hartog et al. |
| 2009/0194333 A1 | 8/2009 | MacDonald |
| 2009/0326826 A1 | 12/2009 | Hull et al. |
| 2010/0076738 A1 | 3/2010 | Dean et al. |
| 2010/0200743 A1 | 8/2010 | Forster et al. |
| 2010/0200744 A1 | 8/2010 | Pearce et al. |
| 2010/0284250 A1 | 11/2010 | Cornish et al. |
| 2011/0019178 A1 | 1/2011 | Vlatas |
| 2011/0188347 A1 | 8/2011 | Thiercelin et al. |
| 2011/0288843 A1 | 11/2011 | Weng et al. |
| 2012/0017687 A1 | 1/2012 | Davis et al. |
| 2012/0057432 A1 | 3/2012 | Hill et al. |
| 2012/0067118 A1 | 3/2012 | Hartog et al. |
| 2012/0092960 A1 | 4/2012 | Gaston et al. |
| 2012/0133367 A1 | 5/2012 | Bittar et al. |
| 2012/0147924 A1 | 6/2012 | Hall |
| 2013/0023353 A1 | 1/2013 | Wright |
| 2013/0032338 A1 | 2/2013 | Kalia et al. |
| 2013/0211726 A1 | 8/2013 | Mestayer et al. |
| 2013/0298635 A1 | 11/2013 | Godfrey |
| 2013/0298665 A1 | 11/2013 | Minchau |
| 2014/0036628 A1 | 2/2014 | Hill et al. |
| 2014/0100274 A1 | 4/2014 | Bobotas et al. |
| 2014/0110124 A1 | 4/2014 | Goldner et al. |
| 2014/0126325 A1 | 5/2014 | Farhadiroushan et al. |
| 2014/0163889 A1 | 6/2014 | Finfer et al. |
| 2014/0180592 A1 | 6/2014 | Ravi et al. |
| 2014/0202240 A1 | 7/2014 | Skinner et al. |
| 2014/0216151 A1 | 8/2014 | Godfrey |
| 2014/0246191 A1 | 9/2014 | Zolezzi-Garreton |
| 2014/0260588 A1 | 9/2014 | Jaaskelainen et al. |
| 2014/0290936 A1 | 10/2014 | Wills et al. |
| 2014/0358444 A1 | 12/2014 | Friehauf et al. |
| 2014/0365130 A1 | 12/2014 | Woods |
| 2015/0000932 A1 | 1/2015 | O'brien |
| 2015/0014521 A1 | 1/2015 | Balfoot |
| 2015/0057934 A1 | 2/2015 | Ma et al. |
| 2015/0083405 A1 | 3/2015 | Dobroskok et al. |
| 2015/0135819 A1 | 5/2015 | Petrella et al. |
| 2015/0146759 A1 | 5/2015 | Johnston |
| 2015/0159478 A1 | 6/2015 | Georgi et al. |
| 2015/0331971 A1 | 11/2015 | Scollard et al. |
| 2016/0003032 A1 | 1/2016 | Grubb et al. |
| 2016/0138389 A1 | 5/2016 | Stokely |
| 2016/0146962 A1 | 5/2016 | Hayward |
| 2016/0191163 A1* | 6/2016 | Preston ................ G01M 11/319 398/16 |
| 2016/0265345 A1 | 9/2016 | In'T Panhuis et al. |
| 2016/0266276 A1 | 9/2016 | Stokely et al. |
| 2016/0356125 A1 | 12/2016 | Bello |
| 2017/0045410 A1 | 2/2017 | Crickmore et al. |
| 2017/0075005 A1 | 3/2017 | Ranjan et al. |
| 2017/0075006 A1 | 3/2017 | Dusterhoft et al. |
| 2017/0191363 A1 | 7/2017 | Dickenson |
| 2017/0205260 A1 | 7/2017 | Jaaskelainen et al. |
| 2017/0260839 A1 | 9/2017 | Beardmore et al. |
| 2017/0260842 A1 | 9/2017 | Jin et al. |
| 2017/0260846 A1 | 9/2017 | Jin et al. |
| 2017/0260849 A1 | 9/2017 | Jin et al. |
| 2017/0260854 A1 | 9/2017 | Jin et al. |
| 2017/0328181 A1 | 11/2017 | Kristjansson et al. |
| 2017/0342814 A1 | 11/2017 | Krueger et al. |
| 2018/0016890 A1 | 1/2018 | Friehauf |
| 2018/0045040 A1 | 2/2018 | Swan et al. |
| 2018/0217285 A1 | 8/2018 | Walters et al. |
| 2018/0230049 A1 | 8/2018 | Wysocki et al. |
| 2018/0348389 A1 | 12/2018 | Jaaskelainen et al. |

FOREIGN PATENT DOCUMENTS

| | | |
|---|---|---|
| WO | 2013092906 | 6/2013 |
| WO | 2014201316 | 12/2014 |
| WO | 2015065869 | 5/2015 |
| WO | 2015076976 | 5/2015 |
| WO | 2015094180 | 6/2015 |
| WO | 2015107332 | 7/2015 |
| WO | 2015170113 | 11/2015 |
| WO | 2015187140 | 12/2015 |
| WO | 2015187149 | 12/2015 |
| WO | 2016007161 | 1/2016 |
| WO | 2016069322 | 5/2016 |
| WO | 2017027340 A1 | 2/2017 |
| WO | 2017039605 | 3/2017 |
| WO | 2017156339 | 9/2017 |
| WO | 2018204920 A1 | 11/2018 |

OTHER PUBLICATIONS

Becker, M.B., et al., "Measuring Hydralic Connection in Fractured Bedrock with Periodic Hydraulic Tests and Distributed Acoustic Sensing," Juounal of Hydrology, pp. 1-11 (Feb. 22-24, 2016).
Boman, K., "DAS technology expands fiber optic applications for oil, gas industry," Rigzone, (May 4, 2015) issue : http://www.rigzone.com/news/oil_gas/a/138405/DAS_Technology_Expands_Fiber_Optic_Applications_for_Oil_Gas_Industry, pp. 4.
Boone, K., et al., "Monitoring Hydraulic Fracturing Operations Using Fiber-Optic Distributed Acoustic Sensing," Unconventional Resources Technology Conference, pp. 8 (2015).
European Search Report for European Application No. EP 17764137.0 dated Mar. 6, 2019.
European Search Report for European Application No. EP 17764143.8 dated Mar. 4, 2019.
European Search Report for European Application No. EP 177641503 dated Mar. 4, 2019.
European Search Report for European Application No. EP 17764151.1 dated Mar. 4, 2019.
European Search Report for European Application No. EP17764146.1 dated Mar. 14, 2019.
Grayson, S., et al., "Monitoring acid stimulation treatments in naturally fractured reservoirs with slickline distributed temperature sensing," Society of Petroleum Engineers, pp. 17, (Jan. 2015).
International Search Report with Written Opinion for International Application No. PCT/US2017/021659 dated Jun. 1, 2017, pp. 7.
International Search Report with written opinion dated Jun. 1, 2017 for International Application No. PCT/US2017/021667, pp. 8.
International Search Report with Written Opinion for International Application No. PCT/US2017/021674 dated May 25, 2017, pp. 10.

(56) References Cited

OTHER PUBLICATIONS

International Search Report with Written Opinion for International Application No. PCT/US2017/021678 dated Jun. 1, 2017, pp. 7.
International Search Report with Written Opinion for International Application No. PCT/US2017/021679 dated May 25, 2017, pp. 7.
International Search Report with Written Opinion for International Application No. PCT/US2017/021681 dated May 22, 2017, pp. 10.
International Search Report with Written Opinion for International Application No. PCT/US2017/21670 dated May 25, 2017, pp. 6.
Jin, G., and Roy, B., "Hydraulic-fracture geometry characterization using low-frequency DAS signal," The Leading Edge, vol. 36, No. 12, pp. 962-1044 (Dec. 2017).
Johannessen, K., et al. "Distributed Acoustic Sensing—a new way of listening to your well/reservoir," Society of Petroleum Engineers, Society of Petroleum Engineers, pp. 1-9 (Mar. 27-29, 2012).
Le Calvez, J. H., et al. "Real-time microseismic monitoring of hydraulic fracture treatment: a tool to improve completion and reservoir management," Society of Petroleum Engineers, pp. 7 (Jan. 2007).
Lord, D.L., "Study of Performation Friction Pressure Employing a Loarge-Scale Fracturing Flow Simulator," SPE Annual technical Conference and Exhibition, pp. 10 (Sep. 25, 1994).
McKinley, R.M., et al., "Specialized Applications of Noise Logging," Journal of Petroleum Technology, vol. 31, Issue 11, pp. 1387-1395 (Nov. 1979).
McKinley, R.M., et al., "The Structure and Interpretation of Noise From Flow Behind Cemented Casing," Journal of Petroleum Technology, vol. 25, No. 3, pp. 329-338 (Mar. 1973).
Molenaar, M., et al, "First Downhole Application of Distributed Acoustic Sensing (DAS) for Hydraulic Fracturing Monitoring and Diagnostics," Society of Petroleum Engineers, vol. 27, No. 1, pp. 32-38 (Mar. 2012).
Molenaar, M.M., et al., "Real-Time Downhole Monitoring of Hydraulic Fracturing Treatments Using Fibre Optic Distributed Temperature and Acoustic Sensing," Society of Petroleum Engineers, pp. 13 (2012).
Optasense, "Pipeline Integrity Management: Leak Detection," accessed at https://ace-control.com.sg/wp-content/uploads/2018/11/Pipeline-Integrity-Management-Leak-Detection.pdf, accessed on Jun. 10, 2019, pp. 5.
Duyang, L-B., et al. "Flow profiling via distributed temperature sensor (DTS) system-expectation and reality," Society of Petroleum Engineers, pp. 14 (2004).
Paleja, R, et al., "Velocity Tracking for Flow Monitoring and Production Profiling Using Distributed Acoustic Sensing," Society of Petroleum Engineers, pp. 16 (Sep. 28-30, 2015).
Portis, D. H., et al., "Searching for the optimal well spacing in the eagle ford shale: A practical tool-kit," Unconventional Resources Technology Conference, pp. 8 (Aug. 12-14, 2013).
Sellwood S.M., et al., "An in-well heat-tracer-test method for evaluating borehole flow conditions," Hydrogeology Journal, Springer, vol. 23, No. 8, pp. 1817-1830 (Aug. 29, 2015).
Webster, P., et al. "Micro-Seismic detection using distributed acoustic sensing," society of Exploration Geophysicists, pp. 5 (Aug. 19, 2013).
Webster, P., et al., "Developments in Diagnostic Tools for Hydraulic Fracture Geometry Analysis," Unconventional Resources Technology Conference, pp. 7 (Aug. 12-14, 2013).
Wheaton, B., et al. "A case study of completion effectiveness in the eagle ford shale using DAS/DTS observations and hydraulic fracture modeling," Society of Petroleum Engineers, pp. 11 (2016).
Wu, K., et al."Mechanism analysis of well interference in unconventional reservoirs: Insights from fracture-geometry simulation between two horizontal wells," Society of Petroleum Engineers, vol. 33, No. 1, pp. 9 (Feb. 2018).
International Search Report with Written Opinion for International Application No. PCT/US2019 dated Jul. 22, 2019.
Bukhamsin, A., et al., Cointerpretation of distributed acoustic and temperature sensing for improved smart well inflow profiling in SPE 180465-MS, Western Regional Meeting Society of Petroleum Engineers (2016).
Byrd, R. H., et al., A limited memory algorithm for bound constrained optimization. SIAM Journal on Scientific Computing, 16 (5), 1190-1208 (1995).
Curtis, M., et al. (1973). Use of the temperature log for determining flow rates in producing wells. In Fall Meeting of the Society of Petroleum Engineers of AIME. Society of Petroleum Engineers 4637 (1973).
Dakin, J., Distributed optical fibre Raman temperature sensor using a semiconductor light source and detector. Electronics letters, 21 (13), 569-570 (1985).
Ouyang, L.-B., Flow profiling by distributed temperature sensor (DTS) system-expectation and reality. SPE Production & Operations, 21 (02), 269-281 (2006).
Ramey Jr, H., et al., Wellbore heat transmission. Journal of Petroleum Technology, 14 (04), 427-435 (1962).
Van der Horst, et al., Fiber optic sensing for improved wellbore production surveillance. In IPTC 2014: International Petroleum Technology Conference (2014).
Vu-Hoang, D., et al., A novel approach to production logging in multiphase horizontal wells. In SPE 89848, Annual Technical Conference and Exhibition. Society of Petroleum Engineers (2004).
International Search Report with Written Opinion for International Application No. PCT/US2018/031404 dated Jul. 13, 2018, pp. 15.
International Search Report with Written Opinion for International Application No. PCT/US2018/056327 dated Dec. 21, 2018, pp. 12.
European Search Report for European Application No. EP18794756.9 dated Apr. 14, 2020.
Rector, J.W., et al—"The Use of an Active Drill Bit for Inverse VSP Measurements", 2018, Exploration Geophysics, vol. 20, Issue 1-2, Abstract only, 5 pgs.
UIRTEC-2670034-MS (2017) Raterman K.Y., et al., Sampling a Stimulated Rock Volume: An Eagle Ford Example.
SPE-168610-MS (2014)-Holley, E.H., et al. "Using Distributed Optical Sensing to Constrain Fracture Models andConfirm Reservoir Coverage in Permian Basin." SPE Hydraulic Fracturing Technology Conference, The Woodlands,Texas, U.S.A., Feb. 4-6.
SPE-153131-PA (2013)—Holley, E.H., et al., "Interpreting Uncemented Multistage Hydraulic-Fracturing Completion Effectiveness by Use of Fiber-Optic DTS Injection Data." SPE Drilling & Completion, 28(3): 243-253.
SPE-107775-PA (2009)—Glasbergen G., et al. "Real-Time Fluid Distribution Determination in Matrix TreatmentsUsing DTS", Society of Petroleum Engineers.
SPE-116182-MS (2008}—Sierra J.R., et al., "DTS Monitoring of Hydraulic Fracturing: Experiences and Lessonseamed", Society of Petroleum Engineers.
SPE-107854-MS (2007}—Tardy, et al., "An Experimentally Validated Wormhole Model for Self-Diverting and: onventional Acids in Carbonate Rocks Under Radial Flow Conditions", Society of Petroleum Engineers.
Ribeiro et al., Detecting Fracture Growth Out of Zone Using Temperature Analysis, Oct. 27-29, 2014, SPE-1707 46-MS, SPE Annual Technical Conference and Exhibition, Amsterdam, The Netherlands, 24 pp. (Year: 2014).
Hesthammer, J et al. "From seismic data to core data: an integrated approach to enhancereservoir characterization"; 2003; Geological Society, London, Special Publications, 209, pp. 39-54.

\* cited by examiner

FIGURE 11

| | Operation | Duration |
|---|---|---|
| Transient | Production | 1 hr |
| | Shut-in | 2 hr |
| | Production | 1 hr |
| | Shut-in | 2 hr |
| | Production | 1 hr |
| Shut-in | Measure Shut-in Temperature | 3 hr |
| | Shut-in | 24 hr |
| Production | Measure flowing Temperature | 3 hr |
| | Stable Production | 24 hr |

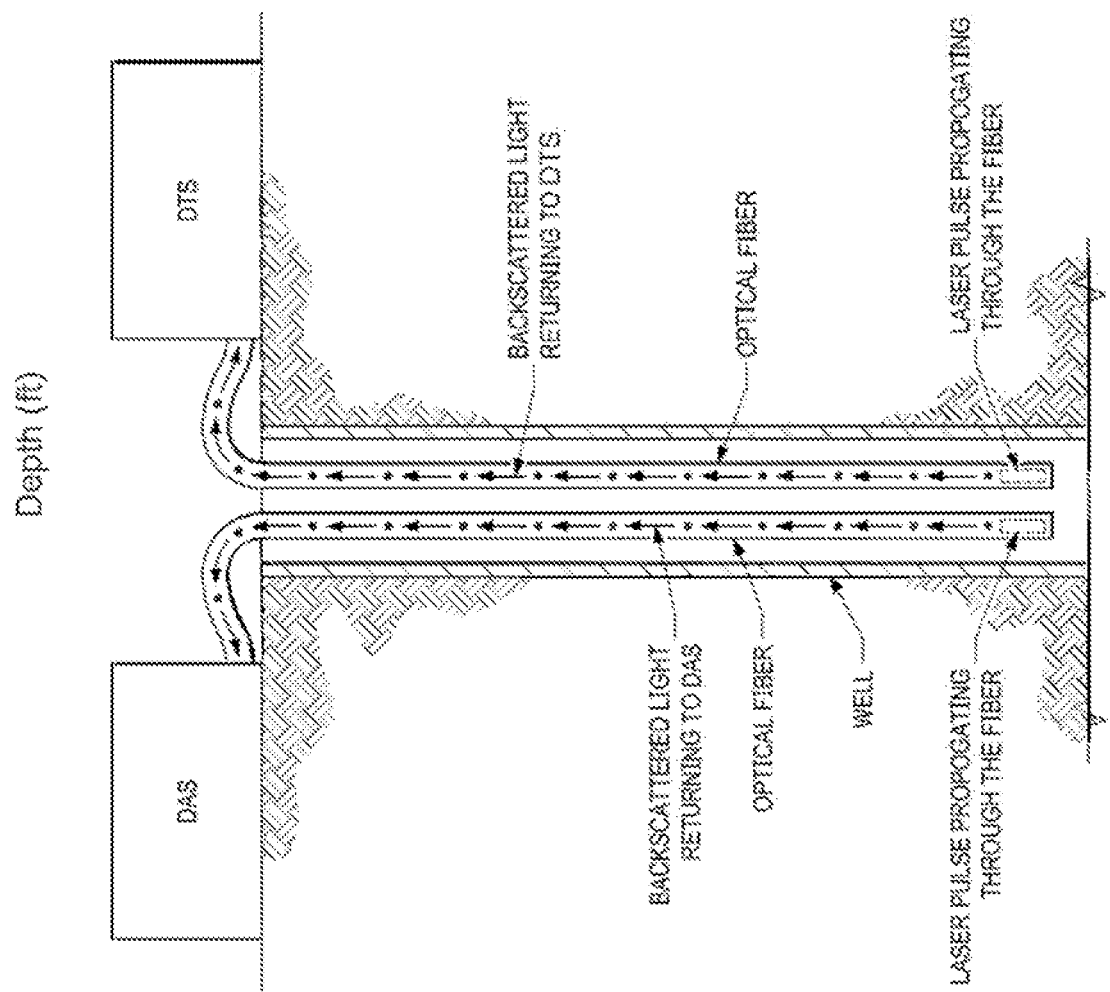

PRODUCTION LOGGING INVERSION BASED ON DAS/DTS

PRIOR RELATED APPLICATIONS

This application claims priority to U.S. Ser. No. 62/665,536, filed May 2, 2018, and incorporated by reference in its entirety for all purposes.

FIELD OF THE DISCLOSURE

The disclosure relates to well logging techniques used in oil and gas recovery operations. In particular, the method uses Distributed Temperature Sensing (DTS) to measure borehole temperatures and uses Distributed Acoustic Sensing (DAS) to measure borehole flow velocities by tracking temperature slugging signals. A Markov Chain Monte Carlo based stochastic inversion is applied to find the statistical distribution of possible production allocations that fit both the temperature and the velocity measurements. This information is then used in subsequent optimization of reservoir planning and completion, and eventually in stimulation and production of hydrocarbons.

BACKGROUND OF THE DISCLOSURE

In the development of oil and gas and other similar wells, it is common to utilize well logging surveys to determine the fraction of oil, gas and unwanted water present in the production zone. This data, along with measurements of the fluid flow velocity, porosity, cross-section of the well, pressure and temperature, may be used to determine production rates and other information from each zone of interest in the well. Such data is useful for optimizing the well's production, oil recovery, water shut-off and/or fracturing sequence, in order to achieve better reservoir management and to reduce intervention costs.

Well logging surveys are performed using logging tools that generally comprise at least one sensor and measure at least one parameter. Logging tools have included spinner type flow meters with attached temperature sensors, which rotate when immersed within a flow stream. However, this type of logging tool has difficulties with mechanical effectiveness. For example, the impeller of the spinner operates on a bearing, which wears and requires frequent inspection and replacement to keep frictional effects from influencing the measurements. Another disadvantage, which increases logging time on the well, is that calibration must be done downhole by making several extra logging runs at various logging speeds. Additionally, the tool requires borehole cleanup before the survey to prevent sensor damage, which significantly increases the cost. Finally, the measurements are less reliable in horizontal wells due to fluid segregation.

Fiber-optic sensing technology has been developed in oil industry recently. Compared with electronic based sensing tools, fiber-optic sensing has many advantages. First, all the sensing instruments are at the surface, so there is no power supply, moving parts, or electronics required in the borehole. Also, fiber-optic sensing can provide measurements along the entire fiber length (as long as 10 miles) with a spatial resolution in terms of feet. Thus, it can cover the entire well bore simultaneously without having to move the tools. Finally, the diameter of the sensing fibers is usually in the range of millimeters, which can be easily integrated into the existing wireline, coil tubing, or carbon-rod cables, and they can be easily protected to endure harsh borehole environments.

Optical fibers have thus been used in a variety of logging tools. One technique for substantially instantaneous temperature measurement is fiber optic Distributed Temperature Sensing (DTS) technology. Temperatures are recorded along the optical sensor cable, thus not at points, but as a continuous temperature profile. A high accuracy of temperature determination is achieved over great distances. Typically the DTS systems can locate the temperature to a spatial resolution of 1 m with accuracy to within ±1° C. at a resolution of 0.01° C. Measurement distances of greater than 30 km can be monitored and some specialized systems can provide even tighter spatial resolutions.

There are two basic principles of measurement for distributed sensing technology, OTDR (Optical Time Domain Reflectometry) and OFDR (Optical Frequency Domain Reflectometry). In addition, a Code Correlation technology is frequently used that carries elements from both principles.

OTDR was developed more than 20 years ago and has become the industry standard for telecom loss measurements which detects the Rayleigh backscattering signals, which dominate over Ramen signals. The principle for OTDR is quite simple and is very similar to the time of flight measurement used for radar. Essentially a narrow laser pulse generated either by semiconductor or solid state lasers is sent into the fiber and the backscattered light is analyzed. From the time it takes the backscattered light to return to the detection unit it is possible to locate the location of the temperature event.

Alternative DTS evaluation units deploy the method of Optical Frequency Domain Reflectometry (OFDR). The OFDR system provides information on the local characteristic only when the backscatter signal detected during the entire measurement time is measured as a function of frequency in a complex fashion, and then subjected to Fourier transformation. The essential principles of OFDR technology are the quasi-continuous wave mode employed by the laser and the narrow-band detection of the optical back scatter signal. This is offset by the technically difficult measurement of the Raman scatter light and rather complex signal processing, due to the FFT calculation with higher linearity requirements for the electronic components.

Code Correlation DTS sends on/off sequences of limited length into the fiber. The codes are chosen to have suitable properties, e.g. Binary Golay code. In contrast to OTDR technology, the optical energy is spread over a code rather than packed into a single pulse. Thus, a light source with lower peak power compared to OTDR technology can be used, e.g. long life compact semiconductor lasers. The detected backscatter needs to be transformed—similar to OFDR technology—back into a spatial profile, e.g. by cross-correlation. In contrast to OFDR technology, the emission is finite (for example 128 bit) which avoids superposing strong scattered signals from short distances over weak scattered signals from afar, thereby improving the shot noise and the signal-to-noise ratio. Using these techniques it is possible to analyze distances of greater than 30 km from one system and to measure temperature resolutions of less than 0.01° C.

Unfortunately, the spatial and temporal resolution of DTS measurements is lacking. As DTS spatially averages temperature over approximately 1 meter lengths, it fails to provide highly precise measurements of the inflow temperature of produced fluids. Further, current DTS interpretation techniques and methods are based on visualization of the temperature change in the DTS data log, and are qualitative in nature, at best.

Distributed Acoustic Sensing or DAS employs a measure of Rayleigh scatter distributed along the fiber optic cable. A coherent laser pulse from an interrogator is sent along the optic fiber and scattering sites within the fiber itself causes the fiber to act as a distributed interferometer with a pre-set gauge length. Thus, interactions between the light and material of the fiber can cause a small amount of light to backscatter and return to the input end, where it is detected and analyzed. Acoustic waves, when interacting with the materials that comprise the optical fiber, create small dynamic density changes, thus affecting the refractive index of the fiber optic cable. These changes affect the backscatter characteristics, thus becoming detectable events. Using time-domain techniques, event location is precisely determined, providing fully distributed sensing with resolution of 1 meter or less.

The intensity and phase of the reflected light is measured as a function of time after transmission of the laser pulse. When the pulse has had time to travel the full length of the fiber and back, the next laser pulse can be sent along the fiber. Changes in the reflected intensity and phase of successive pulses from the same region of fiber are caused by changes in the optical path length of that section of fiber. This type of system is very sensitive to both strain and temperature variations of the fiber and measurements can be made almost simultaneously at all sections of the fiber.

However, different DAS applications and environments have unique characteristics that can create challenges in data analysis, especially when collecting low-frequency data. For example, there is almost always spike noise present resulting from phase errors in the interrogator. In some applications, there is an extremely low-frequency (<1 mHz) drift signal that affect all channels of the DAS interrogator and can be of greater strength (e.g. intensity) than the signal of interest.

Installation issues can also lead to interference. If the fiber optic cable used in DAS sensing is not directly coupled to the borehole, as is the case for in temporary installations, there can be noise associated with vibrations in the fiber casing. The vibration noise can be orders of magnitude higher than the signal of interest, thus effectively masking the signals. In thermal sensing applications, significant thermal dissipation, depending on material properties between the fluid and the fiber itself, can be exhibited.

What is needed in the art are improved methods of well logging for all aspects of oil and gas production. Although well logging is already quite successful, even incremental improvements in technology can mean the difference between cost effective production and reserves that are uneconomical to produce. Ideally, the improved methods would have high spatial and temporal resolution while retaining the ability to provide real time 'snap shots' of the production zone's fluid allocation.

SUMMARY OF THE DISCLOSURE

We developed a novel method of well logging herein that solely relies on fiber-optic sensing measurements to provide production logging results with uncertainty estimations. The method uses Distributed Temperature Sensing to measure borehole temperatures and uses Distributed Acoustic Sensing to measure borehole flow velocities by tracking temperature slugging signals. A Markov Chain Monte Carlo based stochastic inversion is applied to find the statistical distribution of possible production allocations that fit both temperature and velocity measurements.

The method has been verified using synthetic tests. It has been successfully applied on the data collected from an unconventional oil producer. We have also demonstrated that the results can be significantly improved by the implementation of a borehole heater, which increases the temperature differential and improves the signal.

The invention includes any one or more of the following embodiment(s) in any combination(s) thereof:

A method of optimizing production of a hydrocarbon-containing reservoir comprising:
providing one or more fiber optic cables in a well;
measuring low-frequency Distributed Acoustic Sensing (LFDAS) data in said well during a time period of constant flow and during a time period of no flow and during a time period of perturbation of flow;
measuring Distributed Temperature Sensing (DTS) data from said well during a time period of constant flow and during a time period of no flow and during a time period of perturbation of flow;
providing an initial model of reservoir flow using said LFDAS data and said DTS data;
inverting said LFDAS data and said DTS data using Markov chain Monte Carlo method to provide (or predict) a production profile;
using said production profile to optimize said well and future wells in said reservoir and produce hydrocarbons from said optimized wells.

A method of optimizing production of a hydrocarbon-containing reservoir comprising:
a) measuring low-frequency Distributed Acoustic Sensing (LFDAS) data in said well;
b) measuring Distributed Temperature Sensing (DTS) data from said well;
c) providing an initial model of reservoir flow with randomized $P_i$, wherein $P_i$=a normalized productivity of an i-th perforation cluster;
d) repeating step c thousands of times to generate thousands of initial models;
e) inverting U and G using a gradient-descent based method, while holding Pi fixed, wherein U is a conductive heat transfer coefficient between the surrounding reservoir and the borehole fluid, and G is a PVT coefficient;
f) inverting Pi using a Markov chain Monte Carlo method, while holding U and G fixed;
g) repeating steps c-f multiple times to obtain a final model with a lowest misfit;
h) repeating steps g thousands of times to obtain a collection of final models;
i) evaluating all final models to obtain an optimized production profile of said well; and
j) implementing (or using) said optimized production profile to optimize the completion of said well and/or future wells in said reservoir and produce hydrocarbon from said optimized wells.

Any method herein, wherein said one or more fiber optic cables are temporarily installed, or preferably are permanently installed.

A method of optimized production of hydrocarbon from a reservoir, said method comprising:
providing one or more fiber optic cables operably coupled to one or more interrogators in a well;
measuring low-frequency Distributed Acoustic Sensing (LFDAS) data in said well during a time period of constant flow and during a time period of no flow and during a time period of perturbation of flow;
simultaneously measuring Distributed Temperature Sensing (DTS) data from said well during a time period of constant flow and during a time period of no flow and during a time period of perturbation of flow;

using one or more of equations 1-6 or their mathematical equivalents:
  inverting U and G using a gradient-descent based optimization while holding Pi fixed;
  inverting $P_i$ using a Markov chain Monte Carlo optimization;
  repeating step i-ii) thousands of times to generate thousands of initial models;
  randomly perturbing $P_i$ of an initial model to create a new model and retaining said new model as a final model if the penalty function $\in^2$ for the new model is smaller than that of an initial model, and otherwise abandoning said new model;
  repeating step iv for each of said initial models to generate thousands of final models;
  statistically analyzing said final models to obtain predicted production allocation results;
  using said predicted production allocation results to produce hydrocarbon production of said well and future wells in said reservoir.
    Any method herein, using one or more of equations 1-6 or a mathematical equivalent.
    Any method herein, wherein said perturbation of flow is created by opening and closing said well, or where wherein said perturbation of flow is created by heating said well.
    Any method described herein, including the further step of printing, displaying or saving the results of the workflow.
    Any method described herein, further including the step of using said results in a reservoir modeling program to predict reservoir performance characteristics, such as fracturing, production rates, total production levels, rock failures, faults, wellbore failure, and the like.
    Any method described herein, further including the step of using said results to design and implement a hydraulic fracturing program, thereby fracturing the reservoir, or an enhanced oil recovery program or a production plan, thereby producing hydrocarbon.
    A non-transitory machine-readable storage medium, which when executed by at least one processor of a computer, performs the steps of the method(s) described herein.

Hardware for implementing the inventive methods may preferably include massively parallel and distributed Linux clusters, which utilize both CPU and GPU architectures. Alternatively, the hardware may use a LINUX OS, XML universal interface run with supercomputing facilities provided by Linux Networx, including the next-generation Clusterworx Advanced cluster management system. Another system is the Microsoft Windows 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K5000 graphics card and multiple high resolution monitors. Slower systems could also be used, because the processing is less compute intensive than for example, 3D seismic processing.

This summary is provided to introduce a selection of concepts that are further described below in the detailed description. This summary is not intended to identify key or essential features of the claimed subject matter, nor is it intended to be used as an aid in limiting the scope of the claimed subject matter.

"Interference" is used broadly herein to denote anything that affects the signal of the DAS or DTS measurement. This can include vibration, surface noise, seismic noise sources, drifts, and other signal interference mechanisms.

As used herein, the term "interrogator" refers to an electronic device that transmits a signal, in this case a laser pulse through a fiber optic cable, to obtain and record the response. Measurements of background noise are usually taken to determine baseline for the signal and can be subtracted out for improved signal intensity.

Any interrogator can be used to collect the DAS and DTS data.

As used herein, "thermal slugging" refers to a perturbation in temperature that may travel along the wellbore.

As used herein, a "perturbation in flow" refers to a perturbation in either or both of fluid velocity or fluid temperature that may travel along the wellbore.

In the context herein, a "cluster" is a point along the well (x) where it is possible for fluid to enter. In completion engineering, it refers to the set of perforations (holes) grouped together.

As used herein, to "provide" a well or a fiber optic cable in a well does not necessarily imply that a well is contemporaneously drilled and/or fitted with cable, as one could also select a preexisting well and/or cable to start with.

It is understood that in oil and gas production many independent contractors contribute to the eventual production of hydrocarbon from a reservoir, thus, it is common for different entities to contribute to well logging versus well completion versus well production. Nonetheless, the logging and completion and production activities performed hereunder are clearly for the express purpose of optimizing production, and therefore, be attributed thereto to a single actor even when performed by more than one entity or contractor.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| SNR | Signal-to-noise |
| DAS | Distributed Acoustic Sensing |
| DTS | Distributed Temperature Sensing |
| AGC | automatic gain control |
| LFDAS | Low-frequency DAS, <1 Hz, preferably <0.1 HZ |
| FFT | Fast Fourier Transform |
| OTDR | Optical Time Domain Reflectometry OFDR |
| OFDR | Optical Frequency Domain Reflectometry |

-continued

| ABBREVIATION | TERM |
|---|---|
| MCMM | Markov Chain Monte Carlo |
| NCS | Number of Clusters per Stage |
| BFGS | Broyden-Fletcher-Goldfarb-Shanno |

BRIEF DESCRIPTION OF THE DRAWINGS

FIG. 11. An example of a sensing plan to acquire the DAS and DTS data for the production logging inversion.

FIG. 13. Schematic of well with two fiber optic cables therein connected to DAS and DTS interregators/recorders.

DESCRIPTION OF EMBODIMENTS OF THE DISCLOSURE

Figure 1:
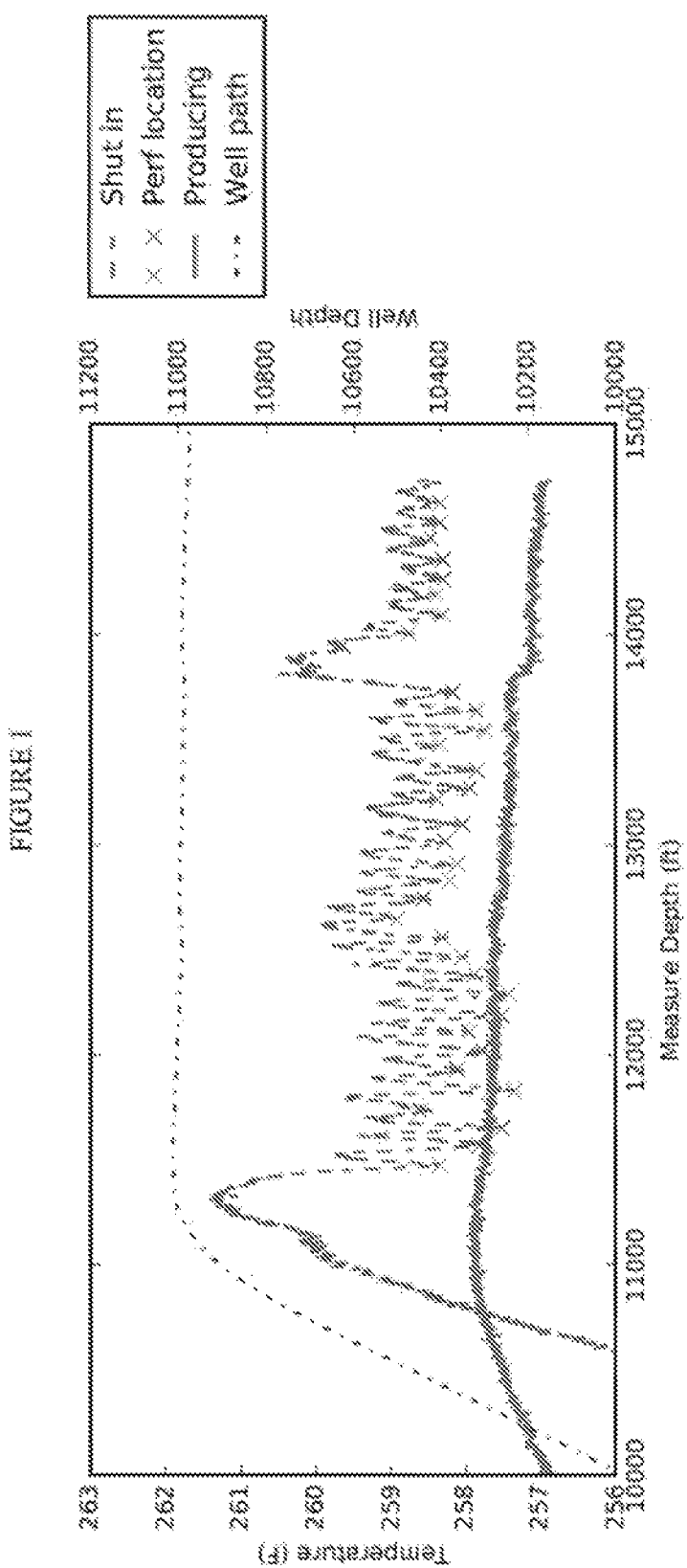
FIG. 1 DTS measurements and well path for a hydraulically-fractured unconventional oil producer. The temperature is measured during shut-in and stable-production periods. Red crosses indicate the locations of perforation clusters. Dot-dashed line plots the true depth of the well.

Swan et al. (2017) developed a novel method that uses low-frequency DAS signal (LFDAS), which is sensitive to small temperature variations, to measure borehole flow velocities. This method was able to provide reliable flow velocity measurements for unconventional oil producers, but the results suffered from low spatial resolution and could not provide estimations at a spacing of perforation clusters.

Temperature measurements have long been used for production logging purposes (e.g., Ramey, 1962; Curtis, 1973). However, it is only applicable for conventional vertical wells, where geothermal gradients are substantial along the well path, and is not reliable for high-deviated horizontal wells due to the solution non-uniqueness (Ouyang, 2006).

By jointly inverting for DAS and DTS measurements, we can better constrain the production allocation with higher spatial resolution and associated uncertainty analysis. We have done this with Markov Chain Monte Carlo based inversion methods.

1 Statistical Procedures 1.1. MCMC-Based Methods

Markov chain Monte Carlo (MCMC) methods comprise a class of procedures used in statistics for sampling from a probability distribution. By constructing a Markov chain that has the desired distribution as its equilibrium distribution, one can obtain a sample of the desired distribution by observing the chain after a number of steps. The more steps there are, the more closely the distribution of the sample matches the actual desired distribution.

When an MCMC method is used for approximating a multi-dimensional integral, an ensemble of "walkers" move around randomly. At each point where a walker steps, the integrand value at that point is counted towards the integral. The walker then may make a number of tentative steps around the area, looking for a place with a reasonably high contribution to the integral to move into next.

Random-walk Monte Carlo methods make up a large subclass of Markov chain Monte Carlo methods. Random walk Monte Carlo methods are a kind of random simulation of Monte Carlo method. However, whereas the random samples of the integrand used in a conventional Monte Carlo integration are statistically independent, those used in Markov chain Monte Carlo methods are correlated. A Markov chain is constructed in such a way as to have the integrand as its equilibrium distribution.

Examples of random walk Monte Carlo methods include the following:

Metropolis-Hastings procedure: This method generates a random walk using a proposal density and a method for rejecting some of the proposed moves. This is sometimes called Metropolis-coupled Markov chain Monte Carlo (MCMCMC).

Gibbs sampling: This method requires all the conditional distributions of the target distribution to be sampled exactly. When drawing from the full-conditional distributions is not straightforward other samplers-within-Gibbs are used. Gibbs sampling is popular partly because it does not require any 'tuning'.

Slice sampling: This method depends on the principle that one can sample from a distribution by sampling uniformly from the region under the plot of its density function. It alternates uniform sampling in the vertical direction with uniform sampling from the horizontal 'slice' defined by the current vertical position.

Multiple-try Metropolis: This method is a variation of the Metropolis-Hastings procedure that allows multiple trials at each point. By making it possible to take larger steps at each iteration, it helps address the curse of dimensionality.

Reversible-jump: This method is a variant of the Metropolis-Hastings procedure that allows proposals that change the dimensionality of the space. Markov chain Monte Carlo methods that change dimensionality have long been used in statistical physics applications, where for some problems a distribution that is a grand canonical ensemble is used (e.g., when the number of molecules in a box is variable). But the reversible-jump variant is useful when doing Markov chain Monte Carlo or Gibbs sampling over nonparametric Bayesian models such as those involving the Dirichlet process or Chinese restaurant process, where the number of mixing components/clusters/etc. is automatically inferred from the data.

Unlike most of the current Markov chain Monte Carlo methods that ignore the previous trials, using a new procedure called a Training-based Markov chain Monte Carlo or TBMCMC, the TBMCMC is able to use the previous steps and generate the next candidate. This training-based procedure is able to speed-up the MCMC procedure by an order of magnitude.

Interacting Markov chain Monte Carlo methodologies are a class of mean field particle methods for obtaining random samples from a sequence of probability distributions with an increasing level of sampling complexity. These probabilistic models include path space state models with increasing time horizon, posterior distributions w.r.t. sequence of partial observations, increasing constraint level sets for conditional distributions, decreasing temperature schedules associated with some Boltzmann-Gibbs distributions, and many others.

In principle, any Markov chain Monte Carlo sampler can be turned into an interacting Markov chain Monte Carlo sampler. These interacting Markov chain Monte Carlo samplers can be interpreted as a way to run in parallel a sequence of Markov chain Monte Carlo samplers. For instance, interacting simulated annealing procedures are based on independent Metropolis-Hastings moves interacting sequentially with a selection-resampling type mechanism. In contrast to traditional Markov chain Monte Carlo methods, the precision parameter of this class of interacting Markov chain Monte Carlo samplers is only related to the number of interacting Markov chain Monte Carlo samplers. These advanced particle methodologies belong to the class of Feynman-Kac particle models, also called Sequential Monte Carlo or particle filter methods in Bayesian inference and signal processing communities. Interacting Markov chain Monte Carlo methods can also be interpreted as a mutation-selection genetic particle procedure with Markov chain Monte Carlo mutations.

The advantage of low-discrepancy sequences in lieu of random numbers for simple independent Monte Carlo sampling is well known. This procedure, known as Quasi-Monte Carlo method (QMC), yields an integration error that decays at a superior rate to that obtained by IID sampling, by the Koksma-Hlawka inequality. Empirically it allows the reduction of both estimation error and convergence time by an order of magnitude.

More sophisticated methods use various ways of reducing the correlation between successive samples. These procedures may be harder to implement, but they usually exhibit faster convergence (i.e. fewer steps for an accurate result).

In addition to the above described MCMC based methods, new MCMC methods may be developed and used in the methods herein.

1.2 Bfgs-Based Procedures

In numerical optimization, the Broyden-Fletcher-Goldfarb-Shanno or BFGS procedure is an iterative method for solving unconstrained nonlinear optimization problems. It belongs to quasi-Newton methods, a class of hill-climbing optimization techniques that seek a stationary point of a (preferably twice continuously differentiable) function. For such problems, a necessary condition for optimality is that the gradient be zero. Newton's method and the BFGS methods are not guaranteed to converge unless the function has a quadratic Taylor expansion near an optimum. However, BFGS has proven to have good performance even for non-smooth optimizations.

In quasi-Newton methods, the Hessian matrix of second derivatives doesn't need to be evaluated directly. Instead, the Hessian matrix is approximated using updates specified by gradient evaluations (or approximate gradient evaluations). Quasi-Newton methods are generalizations of the secant method to find the root of the first derivative for multidimensional problems. In multi-dimensional problems, the secant equation does not specify a unique solution, and quasi-Newton methods differ in how they constrain the solution. The BFGS method is one of the most popular members of this class. Also in common use is L-BFGS, which is a limited-memory version of BFGS that is particularly suited to problems with very large numbers of variables (e.g., >1000). The BFGS-B variant handles simple box constraints.

The above described BFGS-based and any newly developed variants thereof can be used in the methods described herein.

2. Logging Methodology

2.1 DAS Flow Velocity Estimation

DAS signal at very low-frequency band (<0.1 Hz) is very sensitive to small temperature perturbations, which can be used to track convectional thermal slugging during production (Swan 2017). For unconventional oil producers during stable production, the thermal slugging signals could be too small to be detected. As a result, extra well operations or tools have to be involved to create the required signal.

One method that can be applied on hydraulically-fractured unconventional producers is to repeatedly shut in and open the monitored wells, causing a pressure and/or temperature pulse to travel the well. After the hydraulic-fracturing operation, spatial variations of temperature in the formation near the borehole are created due to the uneven stimulation results (various injection volumes and fracture geometry at each perforation cluster). Thermal spatial gradients start to build up in the well bore during shut-in period through the conduction between the borehole fluid and the surrounding formation.

FIG. 1 shows an example of the measured temperature profiles during shut-in period (shut-in temperature) and stable-production period (flowing temperature) of an unconventional oil producer. It is obvious that perforation cluster locations are associated with the local minimums of the shut-in temperature due to the injection of cold fluid. As the well is opened after a period of shut-in, the borehole temperatures are perturbed due to the fluid convection, which can be detected by LFDAS. The signal can be used to estimate flow velocities. The detailed procedure for flow-velocity measurement is described by Swan et al. (2017) and Krueger et al. (2017).

Figure 2:
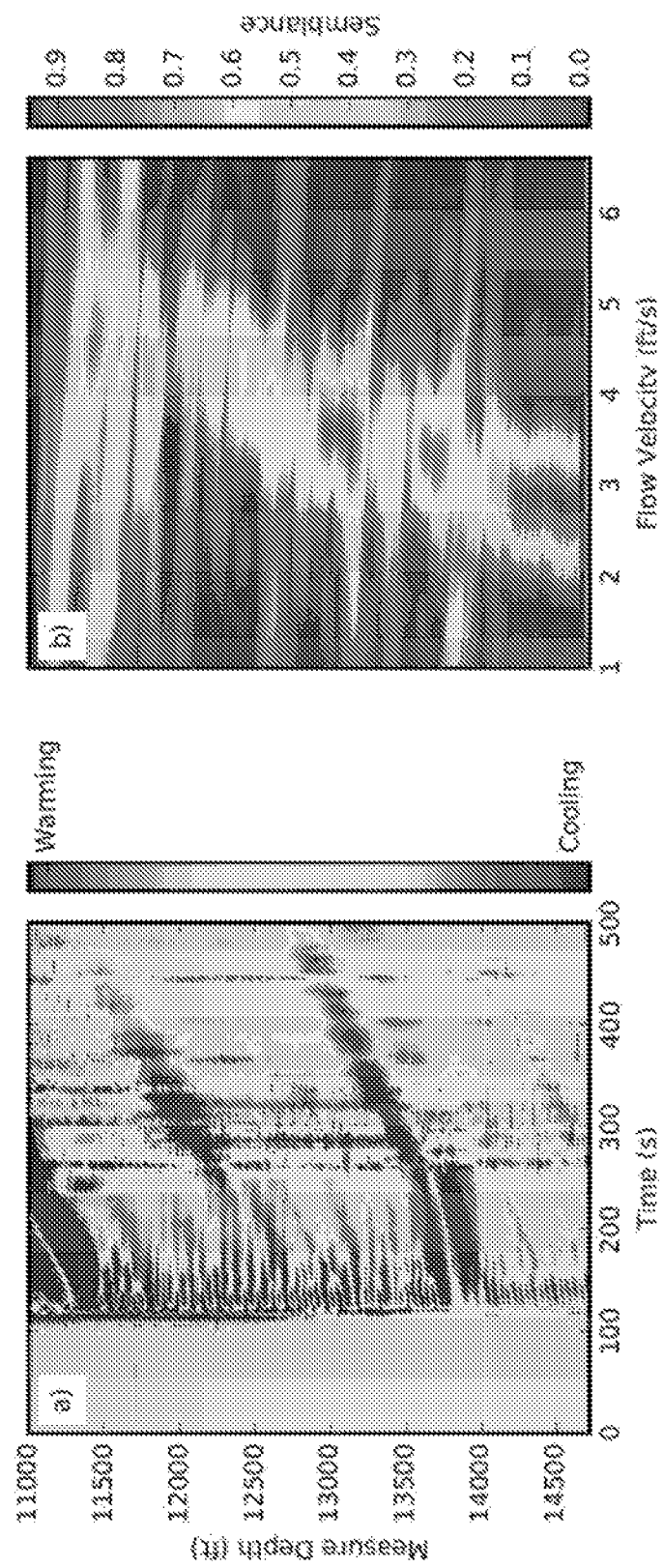
FIG. 2 Flow velocity analysis using LFDAS signal. Left: DAS response during a well opening event. Right: Velocity estimation using semblance analysis.

FIG. 2 shows an example of the LFDAS signal and the corresponding velocity analysis result.

Another way to use LFDAS to measure flow velocities is to place a borehole heater at the end of the fiber. The heater is able to constantly perturb borehole temperature during stable production, which creates the thermal slugging signals in LFDAS for the velocity analysis. This method is more ideal because it directly measures flow velocity during stable production, but does require extra tool implementation. The measured flow velocities are served as inputs for the later inversion.

2.2 Temperature Based Model

The wellbore is simulated by a 1-D model that satisfies the conservation of mass, momentum, and energy. Ouyang (2006) presented a complete equation sets for a three-phase (oil, water, and gas) example. In this study, we demonstrate the procedure using a simplified single-phase model, which assumes different phases are well mixed in the borehole. This assumption is reasonable for fast-producing oil wells, and the simulation model can be replaced by a more complex multi-phase model if necessary.

A simplified 1-D wellbore temperature model during stable production can be presented as:

$$vR\frac{dT}{dx} = v\frac{dR}{dx}(T_p - T) + U(T_f - T) + vRG\frac{dz}{dx}, \qquad (1)$$

where v is the maximum flow velocity at the heel, R represents the spatial distribution of flow velocities, normalized to the range between 0 to 1. T is the borehole fluid temperature during stable production, $T_p$ is the produced fluid temperature at each perforation location, $T_f$ is the surrounding formation temperature. U is a conductive heat transfer coefficient between the surrounding formation and the borehole fluid, which is determined by formation properties, well completion, as well as the heat capacity of fluid and phase combination. G is the PVT coefficient that describes a fluid temperature change when fluids pressure drop occurs due to lifting. Also, x is the coordinate along wellbore (measure depth) and z is true vertical depth of the wellbore.

This equation can be solved using a finite-difference approximation:

$$\frac{T_{i+1} - T_i}{\Delta x} = \frac{R_{i+1} - R_i}{\Delta x}\frac{T_{pi} - T_i}{R_i} + \frac{U}{vR_i}(T_{fi} - T_i) + G\frac{z_{i+1} - z_i}{\Delta x}. \qquad (2)$$

For hydraulically-fractured unconventional oil wells, $T_p$ and $T_f$ can be approximated by the borehole temperatures measured after an extended shut-in period. This approximation simplifies EQ 1 to EQ 3:

$$\frac{dT}{dx} = \left(\frac{dR}{dx} + \frac{U}{v}\right)\frac{\delta T}{R} + G\frac{dz}{dx}, \qquad (3)$$

where T is the difference between the temperature measurements during shut-in and stable production periods. This equation provides important insights for the later uncertainty discussion in Section 3.1.

2.3 INVERSION PROCEDURE

Figure 3:
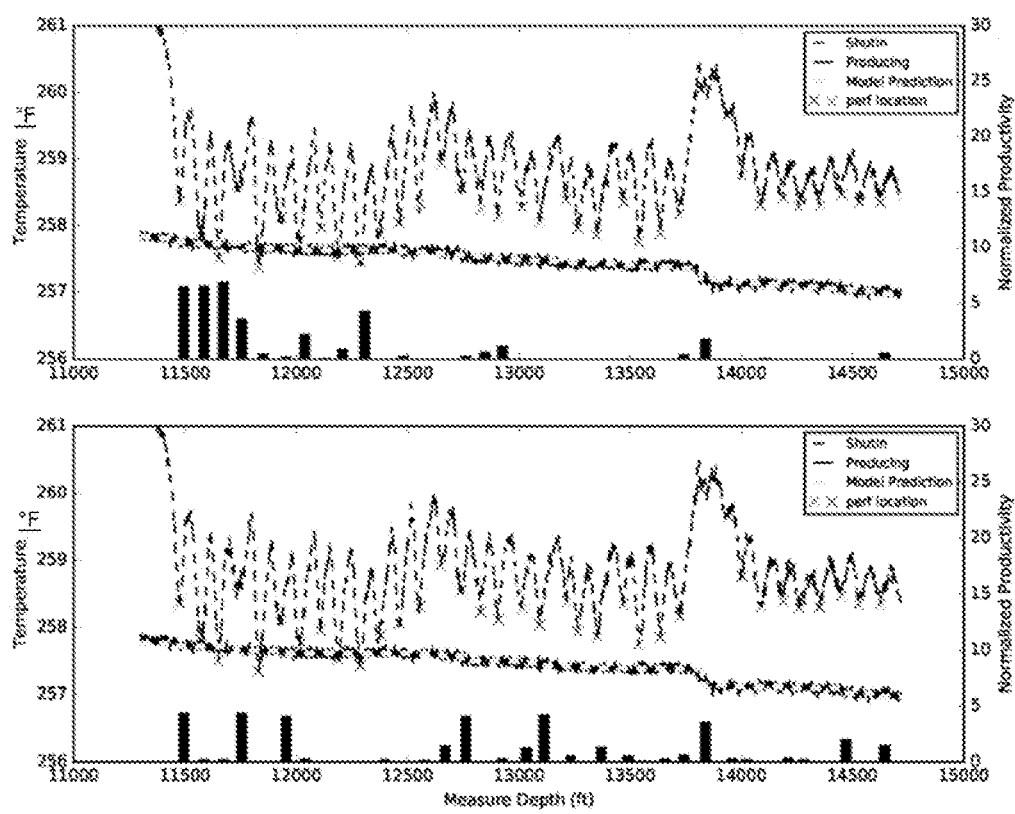
FIG. 3 Two models with different production allocations but similar flowing temperature. Black dashed line plots the shut-in temperature, crosses show the perforation locations. Black solid line shows the measured flowing temperature, thick gray dashed line depicts the model prediction. Bar is the normalized productivity of perforation clusters.

A direct gradient-based inversion of EQ 1 or EQ 3 leads to highly non-unique solutions which are initial-model dependent. FIG. 3 Shows an Example that Two Models with very different production allocations produce almost identical flowing temperatures using EQ 3. Because of this, we adapted an MCMC method to solve the problem stochastically.

U and G are treated as unknowns, since they are critical parameters in the model and are not usually constrained by laboratory results. U and G are not allowed to change spatially, assuming that there are no spatial variations of formation property, well completion, and fluid phase composition in the section of interest. Perforation cluster productivity is defined as a normalized number between 0 and 1. The flow velocity ratio R (x) can be presented as:

$$R(x) = 1 - (1 - R_{bot})\frac{\sum_{i}^{P_x < x} P_i}{\sum_{i=1}^{N} P_i}, \qquad (4)$$

where $P_i$ is the normalized productivity of i-th perforation cluster, $P_x$ is perforation cluster location, $R_{bot}$ is the normalized flow velocity at the end of the sensing section, which can be constrained by LFDAS velocity results and assumed to be known. The goal of the inversion is to find a combination of Pi, U, and G that fits both the flowing temperatures measured by DTS and the flow velocities measured by DAS.

The penalty function $\in^2$ is hence defined as:

$$\in^2 = \|T - T'\|_2 + \lambda\|vR - v'\|_2, \qquad (5)$$

where T' is the measured flowing temperatures, and V' is measured flow velocities.

If the flow velocities are measured during transient periods using the method described in Section 2.1, the total production rate may be different from that during stable production. As a result, the penalty function should be defined as:

$$\in^2 = \|T - T'\|_2 + \lambda\|R - R'\|_2, \qquad (6)$$

where R' is the normalized flow-velocity ratio measured by DAS. In this step we assume the production allocation is the same between the transient period and stable production period.

We apply an iterative two-step inversion procedure to estimate the unknowns. The parameters U and G are inverted by using Broyden-Fletcher-Goldfarb-Shanno (BFGS) procedure, which is a standard gradient-descent based optimization (Byrd 1995).

The $P_i$ are inverted using MCMC, which is a random-walk based inversion procedure. For the $P_i$ inversion, starting from the initial model, $P_i$ is randomly perturbed at each iteration step to create a new model. If the value of the penalty function for the new model is smaller than that of the current model, the current model is updated. Otherwise the new model is dropped, and the current model is randomly perturbed again. This process usually repeats thousands of times.

Thousands of initial models are created randomly (with the procedure described in Section 5.1) and perturbed to obtain a large set of final models. The productivity $P_i$ in each of the final models are then normalized so that the average productivity in each model is 1. Then the final models are statistically analyzed to obtain the production allocation results and uncertainties associated therewith. These results can then be used in continued production of oil, and/or in further optimization of the well and continued production therefrom.

The entire inversion procedure is described as follows:
1. Generate an initial model with randomized $P_i$.
2. Invert for U and G using a gradient-decent based method while fixing Pi.
3. Invert for Pi using MCMC while fixing U and G.
4. Repeat step 2-3 multiple times to obtain a final model.
5. Repeat step 1-4 thousands of times to obtain a collection of final models.
6. Evaluate final models using statistical analysis and use that data in well or production optimization.

3. Synthetic Test

Two synthetic tests were designed to verify the inversion procedure. In both tests, we used the shut-in temperature in FIG. 1 as $T_p$ and $T_s$. We set the normalized flow velocity $R_{bot}$ at the end of the sensing section to be 0.52, U to be $1\times10^{-4}$ s$^{-1}$, and G to be $7\times10^{-4\circ}$ F./ft. The synthetic flowing temperature was calculated using EQ 3. A uniformly distributed random noise with a peak amplitude of 0.1° F. was added. The inversion procedure was applied on the synthetic data and the inverted models were compared with the true model.

3.1 Even Production

Figure 4:
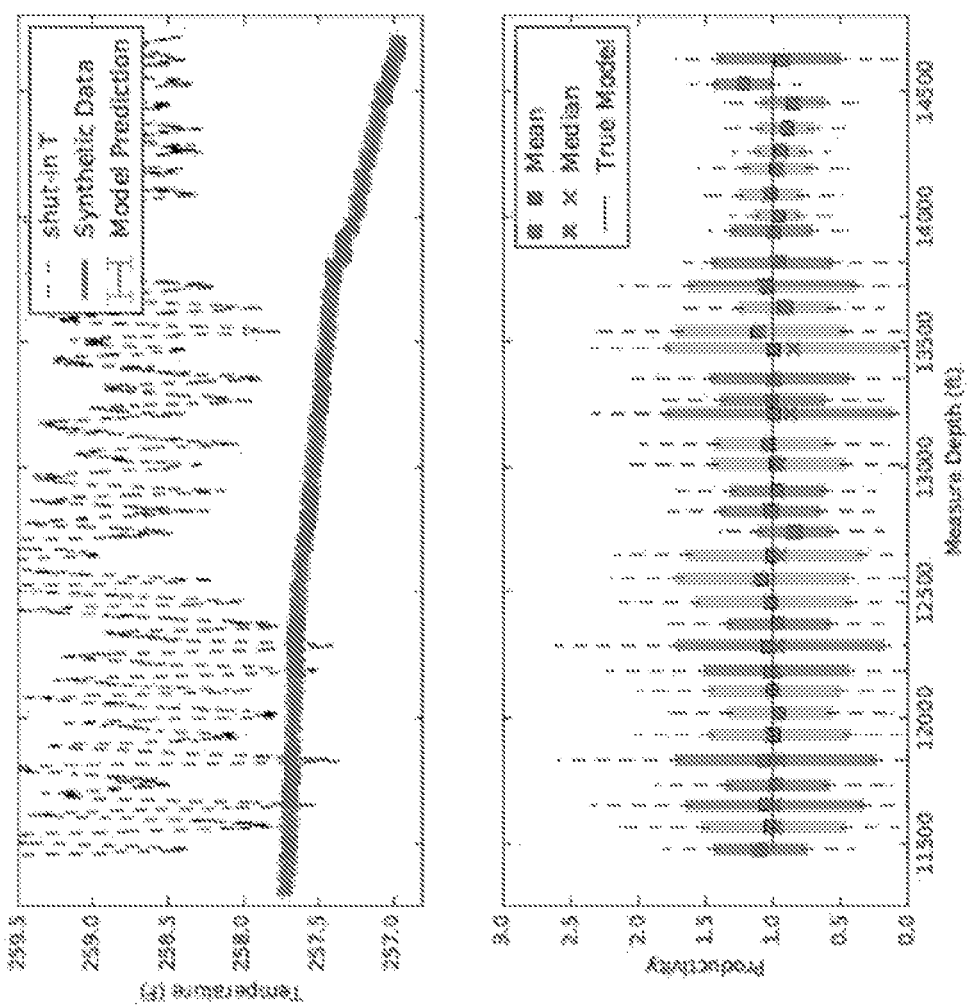
FIG. 4 Results of the synthetic test with even productivity. Upper panel shows the temperature profiles and model predictions. Lower panel shows a statistical box plot of the final models. Dashed line shows the range of 5% and 95% of the models, while gray bars shows 25% and 75%. Red square and green cross are mean and median of the models, respectively.

FIG. 4 shows the inversion results for a synthetic model where the productivities of all perforation clusters are the same. One thousand final models were calculated using the proposed inversion procedure. Most of the models fit the data equally well, with the standard deviations of the predicted flowing temperatures being very small (<0.05° F.). The mean and median values of the perforation cluster productivity of the final models were very close to the true model, with an average error of 7.0% for the means and 7.7% for the medians. As used herein, the "true model" is the model used to generate the synthetic data for the inversion test. It is the true answer of the inversion result.

The uncertainty of the results—shown by dashed line and gray bar in the box plot—systematically increases towards to heel. This is due to the heel-ward increase of the total flow rate in the borehole, where the relative contribution of individual perforation cluster gets smaller. The uncertainty also increases with a smaller δT, because the flowing temperature is less sensitive to the perforation cluster productivity where the produced fluid temperature is the same or similar to the borehole temperature.

The inverted U has a mean value of $1.1\times10^{-4}$ s$^{-1}$ with a standard deviation of $7.2\times10^{-5}$ s$^{-1}$. The inverted G has a mean value of $4.4\times10^{-4\circ}$ F./ft with a standard deviation of $3.2\times10^{-4\circ}$ F./ft. The estimation of U and G can be improved if more vertical section of the well beyond the heel-most perforation is included. However, the included vertical section has to share the same formation thermal property and well completions as the horizontal section.

3.2 Completion Dependent Productivity

In this test, we mimicked a situation that there are three completion designs with different number of clusters per stage (NCS) existing in the sensing section. The designs alternated at each stage with the NCS being 7, 5, 3, 7, 5, 3, and 7 from the heel to the toe. We also assumed that in the true model, the productivity depended on NCS, with clusters in 3 NCS stages being 20% more productive than that in 5 NCS stages, and 50% more productive than that in 7 NCS stages.

Figure 5:
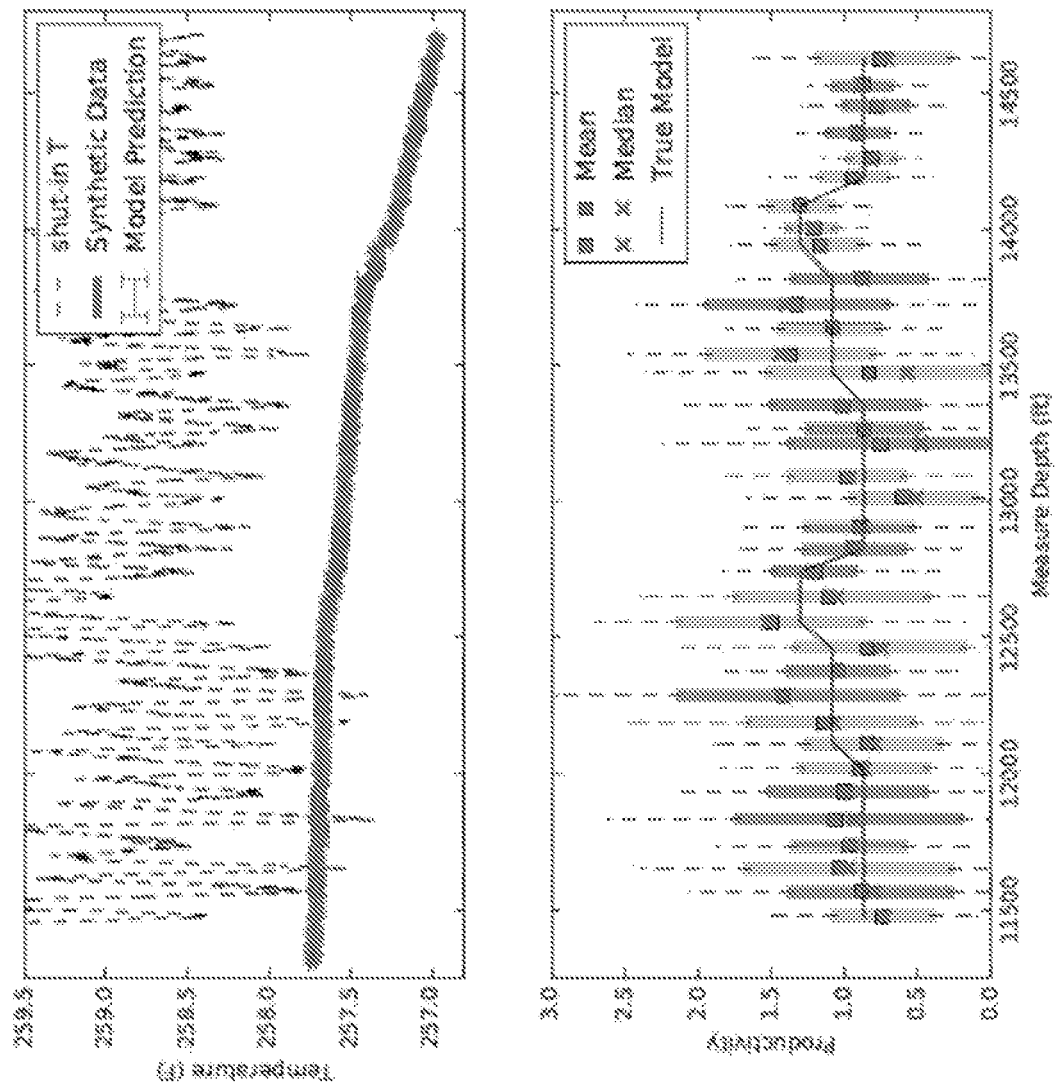
FIG. 5 Same as FIG. 4, except the true model is completion dependent.

FIG. 5 shows the results of this test. The fitting of the flowing temperature is equally good compared with the previous test, but the prediction of the true model is less accurate, with an average error of 15.4% for the means and 19.8% for the medians. The inverted U in this case has a mean value of $1:3\times10^{-4}$ s$^{-1}$ with a standard deviation of $7.7\times10^{-5}$ s$^{-1}$. The inverted G has a mean value of $3.2\times10^{-4\circ}$ F./ft with a standard deviation of $3.1\times10^{-4\circ}$ F./ft.

Figure 6:
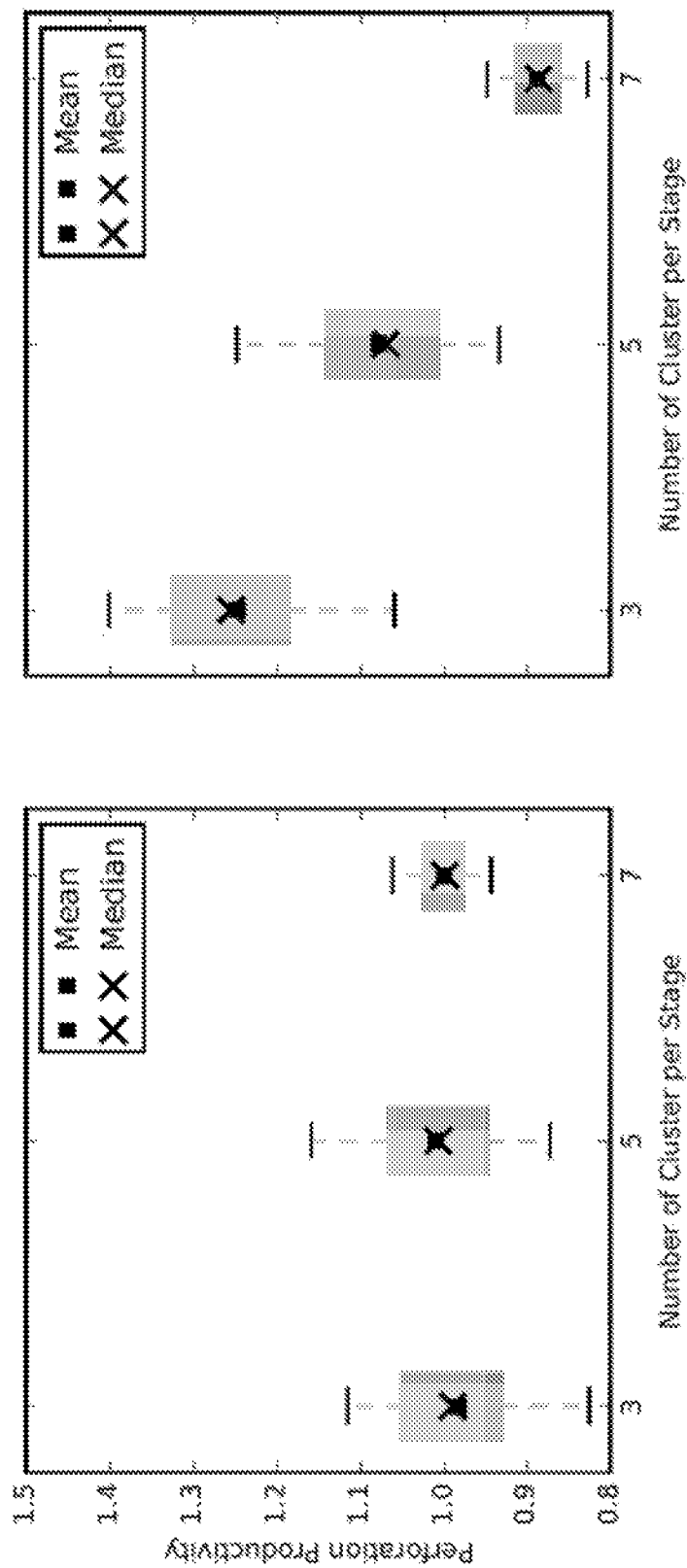
FIG. 6 The averages of perforation cluster productivity per NCS. Left panel is for the even production model and right panel for the NCS-dependent production model. Dashed line defines 5% and 95% range of the final models, while the gray bar defines 25% and 75%.

Although the error for individual perforation clusters was substantial, the productivity differences from various completion designs can be clearly distinguished. The mean values of the perforation clusters with the same NCS were calculated for each final model and are summarized in FIG. 6. The dependency of the productivity on the completion designs can clearly be identified after the averaging of the results.

4 Real Data Result

Figure 7:
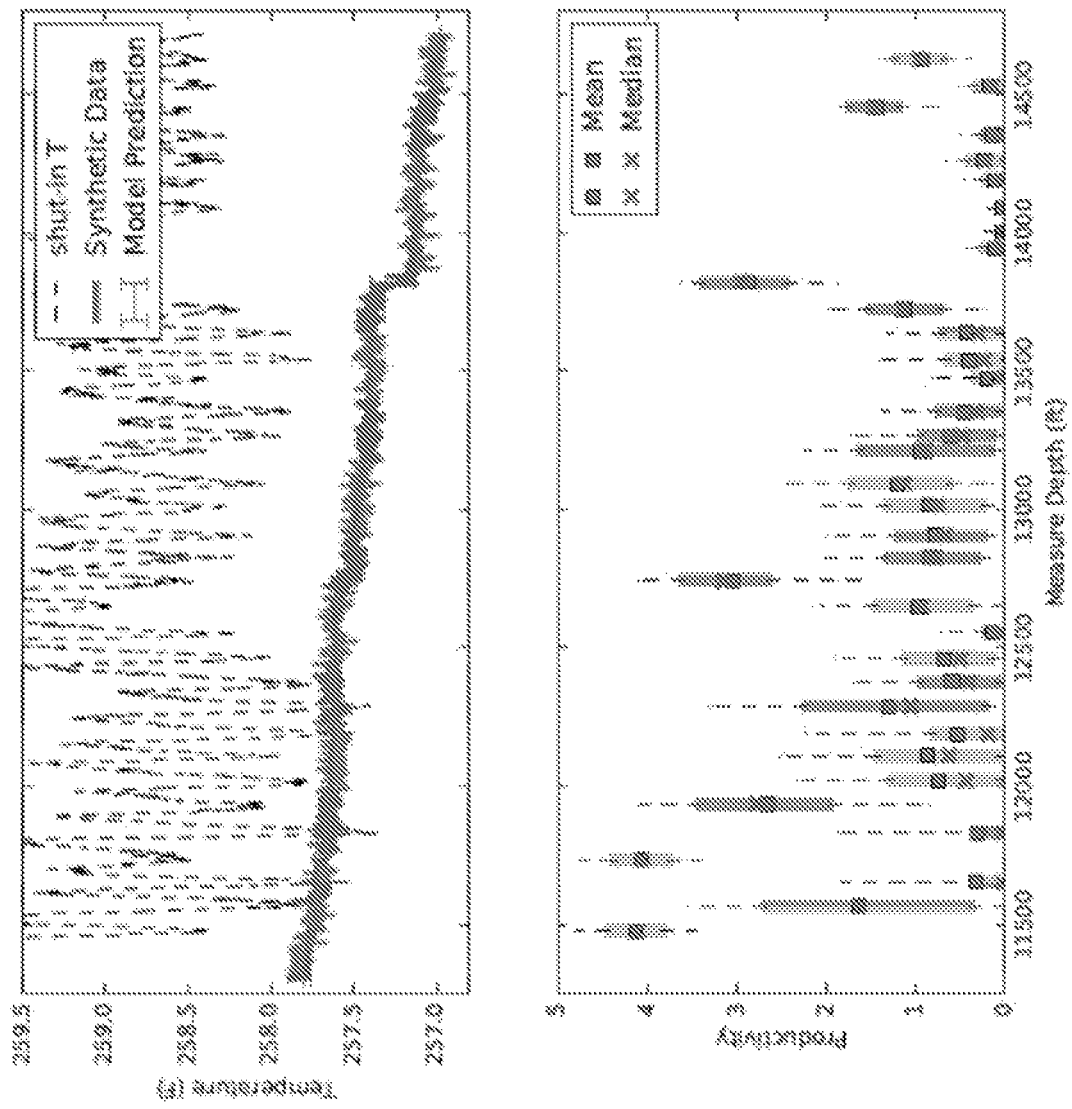
FIG. 7 Inversion results from the real data example.

We then applied the inversion procedure to real data collected from an unconventional oil producer. The well path, flowing and shut-in temperature profiles are as shown in FIG. 1. The fibers used for the DAS and DTS measurements were delivered into the borehole by a carbon rod, which only reached one-third of the horizontal producing section. The ratio of the total production from the section that is beyond the sensing section ($R_{bot}$) is assumed to be 52%, which is constrained by the DAS flow velocity measurement (FIG. 2). Only the well section with measured depth deeper than 11300 ft was included in the inversion, due to a sudden change of geothermal gradient, which related to the conductivity of the formation rocks, at the measured depth around 11200 ft (FIG. 1). The results of the inversion are shown in FIG. 7. Unlike the synthetic test results, the results from the real data show some of the clusters producing statistically more than other clusters by a number of times.

5.1 Random Sampling Procedure

We found that a uniformly-distributed random productivity for each perforation cluster cannot efficiently sample all possible production profiles (FIG. 8A), because it has little probability of creating long-wavelength signals (a large well section that has larger or smaller productivity). We thus developed a new sampling procedure to generate long-wavelength signals.

Figure 8:
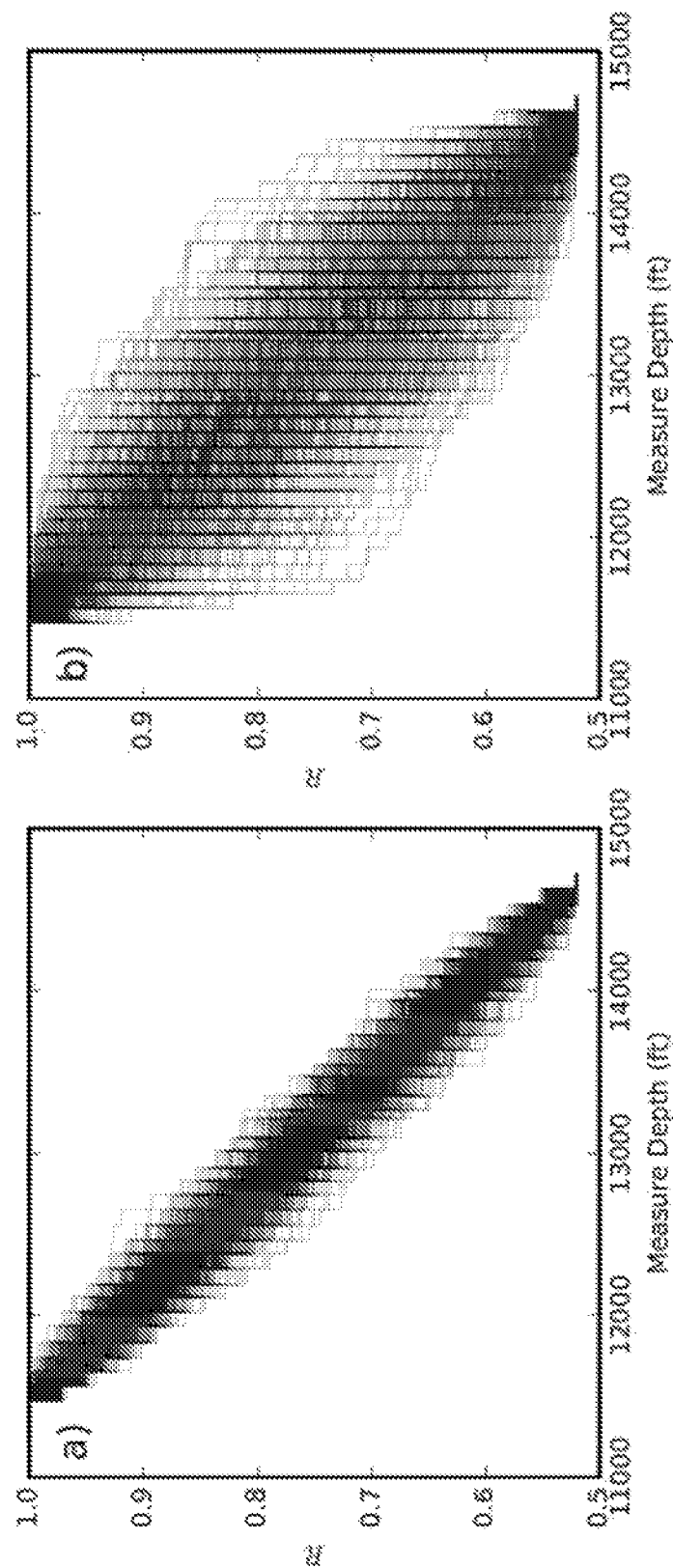
FIG. 8 Comparison between two different random sampling procedures to create initial models: a) the productivity of each perforation cluster is uniformly distributed, b) sampling procedure described in Section 5.1.

Ten random numbers between 1 and $R_{bot}$ were generated and sorted with a descent order. Together with 1 and $R_{bot}$, the twelve numbers were assigned as the R value at evenly spaced points within the sensing section, and linearly interpolated for the values in between. $P_i$ was then calculated using EQ 4. This method creates initial models that contain long-wavelength signals. The later random perturbation in the MCMC inversion added short-wavelength signals to the final models. FIG. 8 shows a comparison of R profiles between the uniform random sampling and our sampling procedure for 1000 initial models. Our sampling procedure covers a much larger range of possible flow rate profiles than the random sampling procedure.

5.2 DAS Velocity Constraint

For horizontal wells with small spatial temperature gradients, inversion results only based on temperature measurements are highly non-unique, and could be biased. For demonstration purposes, we modified the synthetic test in Section 3.1. While keeping all the inputs the same, we changed the presumed bottom rate $R_{bot}$ to 70%, instead of 52% that the true model had. We also set the weighting parameter λ to zero to eliminate the constraint from the DAS velocity measurements.

Figure 9:
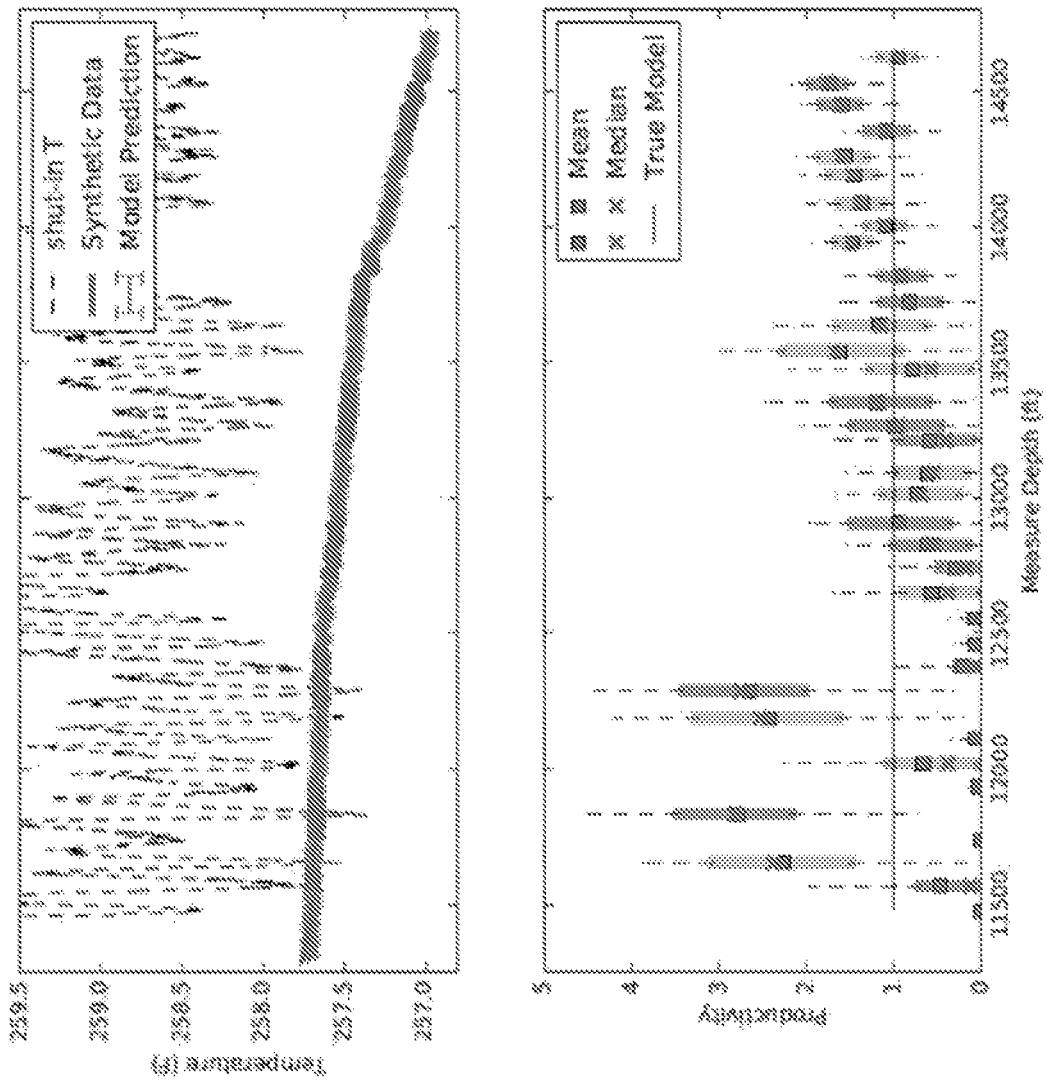
FIG. 9 Same as FIG. 4, except the input $R_{bot}$ is different from the true model and there is no constraint from the DAS velocity measurement ($\lambda=0$).

The results, which are shown in FIG. 9, are significantly biased from the true model. On the other hand, if the bottom rate $R_{bot}$ is set correctly, the inversion results based only on temperature measurements should be consistent with the flow velocities which are measured independently by LFDAS.

Figure 10:
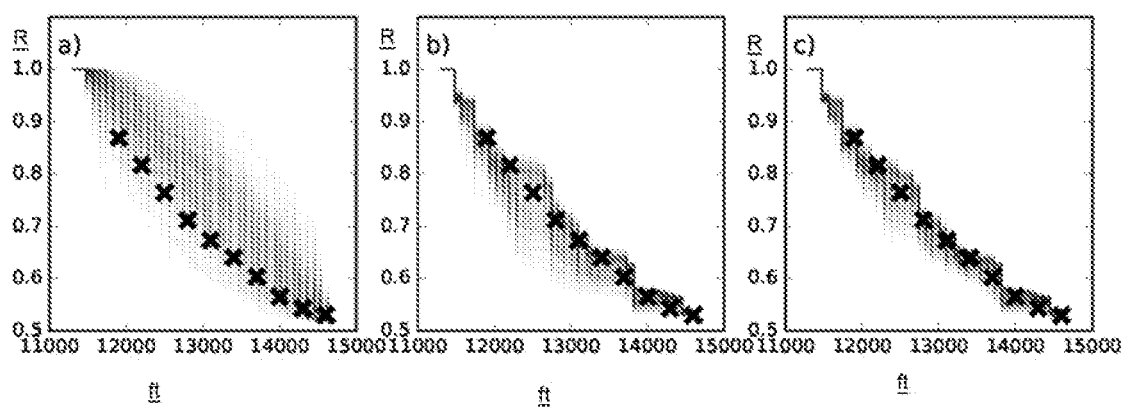
FIG. 10. Comparison between the flow velocity distribution R and DAS velocity measurements for the real data example in Section 4. Black lines are individual models and red cross shows normalized DAS velocity measurement: a) initial model distribution, b) final model distribution without velocity constrain ($\lambda=0$), c) final model distribution with velocity constrain ($\lambda=1$).

FIG. 10 shows the comparison between the flow velocity distribution R, from the inversion results where the velocity constraint is eliminated (λ=0), and the DAS measured velocities (normalized) for the real data example in Section 4. The difference between the initial models (FIG. 10A) and final models (FIG. 10B) demonstrates the constraint of the temperature measurements on the results. It is clear that even without constraint of the velocity measurements (except for the bottom rate), the results based only on temperature measurements are consistent with the flow velocities measured independently by LFDAS. However, the uncertainty of the results can be further decreased by adding the velocity constraint (FIG. 10C).

5.3 Sensing Plan

In order to efficiently acquire the temperature and the flow-velocity measurements, a proper sensing procedure should be planned before the data acquisition. FIG. 11 shows an example of the sensing plan. The sensing plan should contain three key components: a long stable production period to stabilize the production flow and measure flowing temperature, an extended shut-in period to measure the formation temperature, and a transient period with a series of opening and closing operations to create the thermal slugging signals for the LFDAS flow-velocity measurements. If a borehole heater is available to create the required thermal perturbations, the transient period in the sensing plan can be removed, as the flow velocities can be measured during stable production.

5.4 Utilize a Borehole Heater

If a borehole heater can be deployed during DAS recording to create and increase the strength of the temperature signal, the production logging results can be significantly improved. First, the flow velocities can be directly measured by LFDAS during stable production, which are more reliable than the transient-period measurements. Secondly, if the heater is placed near the end of the sensing section, and is powerful enough to raise the borehole fluid temperature at the end of the fiber, the temperature difference between the flowing temperature and shut-in temperature can be artificially increased to lower the uncertainties of the inversion results.

Figure 12:
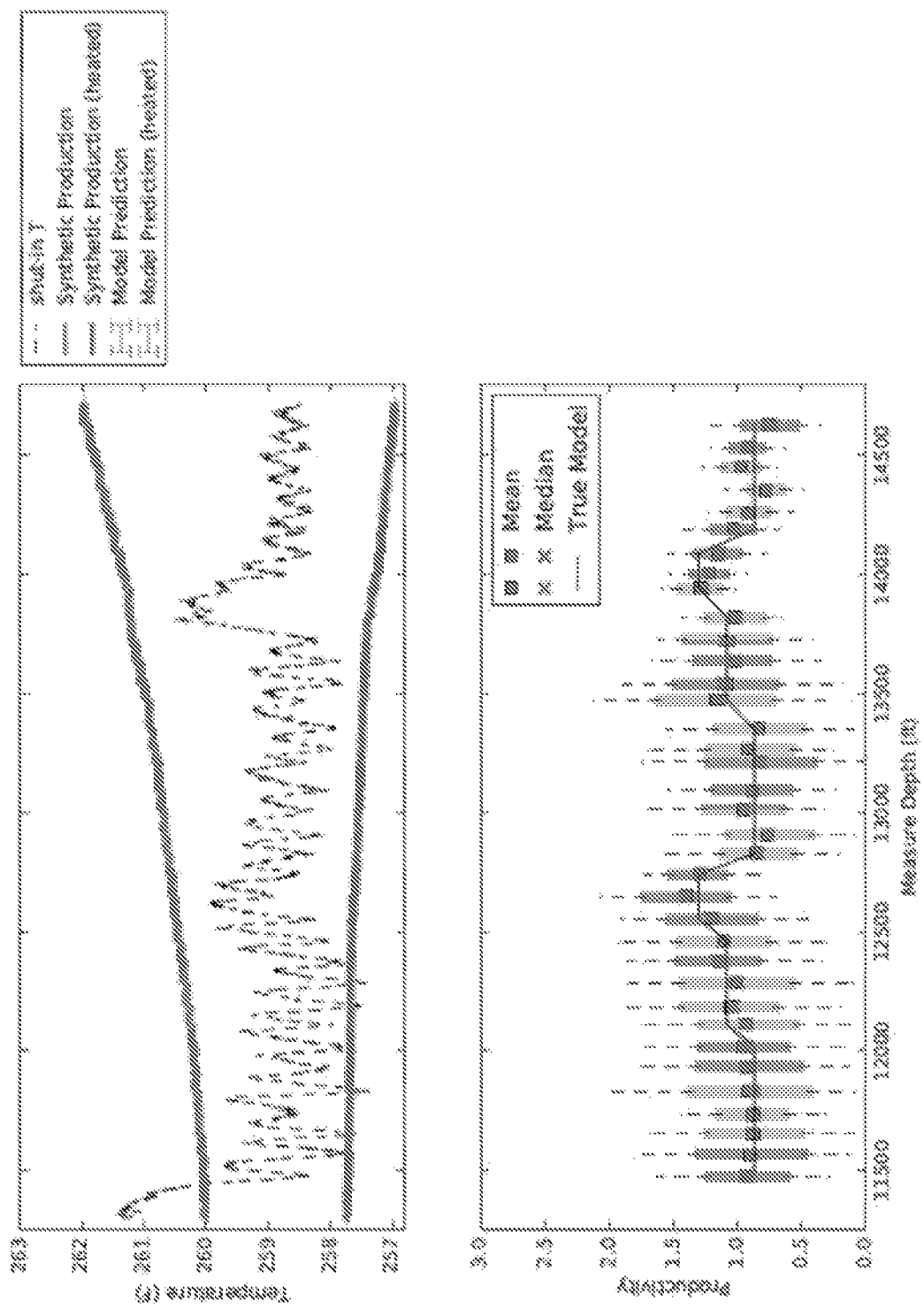
FIG. 12. Same as FIG. 4 except a heater is placed at the end of the fiber to heat up the borehole fluid by 5° F.

FIG. 12 shows the inversion results of the NCS dependent production model in Section 3.2, except here the borehole fluid temperature at the fiber end was raised 5° F. by a heater. The heated flowing temperature and the original flowing temperature are inverted simultaneously. The errors of the resulted productivity are 7.5% for both means and medians, which are much smaller than the case without heater (>15%). Thus, we have shown that adding a heater to raise the temperature by about 5° F. significantly improved the reliability of the results.

The following references are expressly incorporated by reference in their entirety for all purposes.

Bukhamsin, A., et al. (2016). Cointerpretation of distributed acoustic and temperature sensing for improved smart well inflow profiling. In SPE Western Regional Meeting. Society of Petroleum Engineers.

Byrd, R. H., et al., (1995). A limited memory algorithm for bound constrained optimization. SIAM Journal on Scientific Computing, 16 (5), 1190-1208.

Curtis, M., et al. (1973). Use of the temperature log for determining flow rates in producing wells. In Fall Meeting of the Society of Petroleum Engineers of AIME. Society of Petroleum Engineers.

Dakin, J., (1985). Distributed optical fibre Raman temperature sensor using a semiconductor light source and detector. Electronics letters, 21 (13), 569-570.

Hill, A. D. (1990). Production logging: theoretical and interpretive elements.

Ouyang, L.-B., (2006). Flow profiling by distributed temperature sensor (DTS) system-expectation and reality. SPE Production & Operations, 21 (02), 269-281.

Paleja, R., et al. (2015). Velocity tracking for flow monitoring and production profiling using distributed acoustic sensing. In SPE Annual Technical Conference and Exhibition. Society of Petroleum Engineers.

Ramey Jr, H., et al. (1962). Wellbore heat transmission. Journal of Petroleum Technology, 14 (04), 427-435.

Van der Horst, et al. (2014). Fiber optic sensing for improved wellbore production surveillance. In IPTC 2014: International Petroleum Technology Conference.

Vu-Hoang, D., et al. (2004). A novel approach to production logging in multiphase horizontal wells. In SPE Annual Technical Conference and Exhibition. Society of Petroleum Engineers.

US20140358444 Method of Hydraulic Fracture Identification Using Temperature

US20170260842 Low Frequency Distributed Acoustic Sensing

US20170260846 Measuring downhole temperature by combining DAS/DTS data

US20170260849 DAS method of estimating fluid distribution

US20170260854 Hydraulic fracture monitoring by low-frequency DAS

US20170342814 Production Low-frequency DAS SNR improvement

US20180045040 Production logs from distributed acoustic sensors

US20180016890 Hydraulic fracture analysis

U.S. Pat. No. 9,347,310 Multiphase flowmeter for subsea applications.

The invention claimed is:

1. A method of optimizing production of a hydrocarbon-containing reservoir comprising:
   a) providing one or more fiber optic cables in a well;
   b) measuring low-frequency Distributed Acoustic Sensing (LFDAS) data in said well during a time period of constant flow and during a time period of no flow and during a time period of perturbation of flow;
   c) measuring Distributed Temperature Sensing (DTS) data from said well during said time period of constant flow and during said time period of no flow and during said time period of perturbation of flow;

d) providing, an initial model of reservoir flow using, said LFDAS data and said DTS data;
e) inverting said LFDAS data and said DTS data using Markov chain Monte Carlo method to provide a production profile for said well; and
f) using said production profile to optimize said well and future wells in said reservoir and produce hydrocarbons therefrom.

2. The method of claim 1, wherein said perturbation of flow is created by opening and closing said well.

3. The method of claim 1, wherein said perturbation of flow is created by heating said well.

4. The method of claim 1, using equations (1) or (2) or (3) plus equations (4), (5), and (6), or mathematical equivalents thereof:

$$vR\frac{dT}{dx} = v\frac{dR}{dx}(T_p - T) + U(T_f - T) + vRG\frac{dz}{dx}, \quad (1)$$

where v is a maximum flow velocity at a heel of said well,
R is a spatial distribution of flow velocity profile, normalized to the range between 0 to 1,
T is a borehole fluid temperature during stable production,
$T_p$ is a produced fluid temperature at each perforation location,
$T_f$ is a surrounding formation temperature,
U is an overall heat transfer coefficient between said surrounding formation and said borehole fluid,
G is a PVT coefficient,
x is the measured depth of the wellbore,
z is the true depth of the wellbore;

$$\frac{T_{i+1} - T_i}{\Delta x} = \frac{R_{i+1} - R_i}{\Delta x}\frac{T_{pi} - T_i}{R_i} + \frac{U}{vR_i}(T_{fi} - T_i) + G\frac{z_{i+1} - z_i}{\Delta x}. \quad (2)$$

where i refers to the i-th perforation cluster;

$$\frac{dT}{dx} = \left(\frac{dR}{dx} + \frac{U}{v}\right)\frac{\delta T}{R} + G\frac{dz}{dx}, \quad (3)$$

where $\delta T$ is the difference between the temperature measurements during shut-in and stable production periods;

$$R(x) = 1 - (1 - R_{bot})\frac{\sum_{i}^{P_x < x} P_i}{\sum_{i=1}^{N} P_i}, \quad (4)$$

wherein R(x) is normalized flow velocity profile,
wherein $P_i$ is the normalized productivity of i-th perforation cluster,
$P_x$ is a perforation cluster location, and
$R_{bot}$ is a normalized flow velocity at the toe end of a sensing section;

$$\in^2 = \|T - T'\|_2 + \lambda\|vR - v'\|_2, \quad (5)$$

wherein $\in^2$ is a penalty function,
T is a measured flowing temperature in the wellbore, and
V' is a measured flow velocity in the wellbore;

$$\in^2 = \|T - T'\|_2 + \lambda\|R - R'\|_2, \quad (6)$$

where R' is the normalized flow-velocity ratio measured by DAS.

5. The method of claim 1, using equations (2), (4), and (5) or (6).

6. The method of claim 1, wherein said one or more fiber optic cables are temporarily installed.

7. The method of claim 1, wherein said one or more fiber optic cables are permanently installed.

8. A method of optimizing production of a hydrocarbon-containing reservoir comprising:
a) measuring low-frequency Distributed Acoustic Sensing (LFDAS) data in a well;
b), measuring Distributed Temperature Sensing (DTS) data from said well;
c) providing an initial model of reservoir flow with randomized $P_1$, wherein $P_i$=a normalized productivity of an i-th perforation cluster;
d) repeating step c thousands of times to generate thousands of initial models;
e) inverting U and G using a gradient-descent based method, while holding $P_1$ fixed, wherein U is a conductive heat transfer coefficient between the surrounding reservoir and the borehole fluid, and G is a PVT coefficient;
f) inverting $P_1$ using a Markov chain Monte Carlo method, while holding U and G fixed;
g) repeating steps c-f multiple times to obtain a final model with a lowest misfit;
h) repeating step g thousands of times to obtain a collection of final models;
i) evaluating all final models to obtain a production profile of said well; and
j) using said production profile to optimize a completion of said well and/or future wells in said reservoir; and
k) producing hydrocarbon from said well and/or said future wells.

9. The method of claim 8, using one or more of equations (1)-(6) or a mathematical equivalent.

10. The method of claim 8, using equations (1), (4), and (5) of (6).

11. The method of claim 8, using equations (2), (4), and (5).

12. The method of claim 8, using equations (2), (4), and (5) or (6).

13. A method of optimizing production of hydrocarbon from a reservoir, said method comprising:
a) providing one or more fiber optic cables operably coupled to one or more interrogators in a well;
b) measuring low-frequency Distributed Acoustic Sensing (LFDAS) data in said well during a time period of constant flow and during a time period of no flow and during a time period of perturbation of flow;
simultaneously measuring Distributed Temperature Sensing (DTS) data from said well during said time period of constant flow and during said time period of no flow and during said time period of perturbation of float;
d) using one or more of equations 1-6 or their mathematical equivalents:
i) inverting U and G using a gradient-descent based optimization while bolding Pi fixed;
ii) inverting $P_1$ using a Markov chain Monte Carlo optimization;
iii) repeating step i-ii) thousands of times to generate thousands of initial models;
iv) randomly perturbing $P_1$ of an initial model to create a new model and retaining said new model as a final model if a penalty function $\in^2$ for said new model is smaller than that of said initial model, and otherwise abandoning said new model;

v) repeating step iv for each of said initial models to generate thousands of final models;

vi) statistically analyzing said thousands of final models to obtain production allocation results; and e) using said production allocation to optimize production of hydrocarbon from said well and future wells in said reservoir.

14. The method of claim 13, wherein said perturbation of flow is created by opening and closing said well.

15. The method of claim 13, wherein said perturbation of flow is created by heating said well.

16. The method of claim 13, wherein LFDAS uses <0.1 Hz.

17. A method of logging a reservoir, said method comprising:

a) providing one or more fiber optic cables operably coupled to one or more interrogators in a well, wherein one or more fiber optic cables are permanently installed in said well;

b) measuring low-frequency Distributed Acoustic Sensing (LFDAS) data in said well during a time period of constant flow and during a time period of no how and during a time period of perturbation of flow;

c) simultaneously measuring Distributed Temperature Sensing (DTS) data from said well during said time period of constant flow and during said time period of no flow and during said time period of perturbation of flow;

d) using one or more of equations 1-6 or their mathematical equivalents:

i) inverting U and (i using a gradient-descent based optimization while holding $P_1$ fixed;

ii) inverting P using to Markov chain Monte Carlo optimization;

iii) repeating step i-ii) thousands of times to generate thousands of initial models;

iv) randomly perturbing $P_i$ of an initial model to create a new model and retaining said new model as a final model if a penalty function $\in^2$ for the new model is smaller than that of said initial model, and otherwise abandoning said new model;

v) repeating step iv for each of said initial models to generate thousands of final models; and vi) statistically analyzing said final models to obtain production allocation results from said well.

* * * * *

UNITED STATES PATENT AND TRADEMARK OFFICE
CERTIFICATE OF CORRECTION

| | | |
|---|---|---|
| PATENT NO. | : 11,021,934 B2 | |
| APPLICATION NO. | : 16/401620 | |
| DATED | : June 1, 2021 | |
| INVENTOR(S) | : Ge Jin, Kyle Friehauf and Baishali Roy | |

It is certified that error appears in the above-identified patent and that said Letters Patent is hereby corrected as shown below:

In the Claims

On Column 18, Line 40:
'(5) of (6).' should read as ---(5) or (6).---
On Column 18, Line 53:
'simultaneously measuring Distributed Temperature Sens-' should read as ---c) simultaneously measuring Distributed Temperature Sens- ---
On Column 18, Line 61:
'ii) inverting P1 using a Markov chain Monte Carlo' should read as ---ii) inverting Pi using a Markov chain Monte Carlo---
On Column 18, Line 65:
'iv) randomly perturbing P1 of initial model to create' should read as ---iv) randomly perturbing Pi of initial model to create---
On Column 19, Line 23:
'constant flow and during a time period of no how and' should read as ---constant flow and during a time period of no flow and---
On Column 20, Line 8:
'i) inverting U and (i using a gradient-descent based' should read as ---i) inverting U and G using a gradient-descent based---
On Column 20, Line 9:
'optimization while holding P1 fixed;' should read as ---optimization while holding Pi fixed;---
On Column 20, Line 10:
'ii) inverting P1 using to Markov chain Monte Carlo' should read as ---ii) inverting Pi using a Markov chain Monte Carlo;---

Signed and Sealed this
Third Day of January, 2023

Katherine Kelly Vidal
*Director of the United States Patent and Trademark Office*